(12) United States Patent
Hario et al.

(10) Patent No.: US 11,601,064 B2
(45) Date of Patent: Mar. 7, 2023

(54) POWER CONVERSION DEVICE HAVING A FREQUENCY OF A FIRST CONTROL SIGNAL HIGHER THAN A FREQUENCY OF A SECOND CONTROL SIGNAL

(71) Applicant: Mitsubishi Electric Corporation, Tokyo (JP)

(72) Inventors: Masahiro Hario, Tokyo (JP); Noriyuki Imada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 351 days.

(21) Appl. No.: 16/958,400

(22) PCT Filed: Jan. 12, 2018

(86) PCT No.: PCT/JP2018/000695
§ 371 (c)(1),
(2) Date: Jun. 26, 2020

(87) PCT Pub. No.: WO2019/138550
PCT Pub. Date: Jul. 18, 2019

(65) Prior Publication Data
US 2021/0058007 A1 Feb. 25, 2021

(51) Int. Cl.
*H02M 7/483* (2007.01)
*H02M 7/5387* (2007.01)

(52) U.S. Cl.
CPC ........ *H02M 7/483* (2013.01); *H02M 7/4835* (2021.05); *H02M 7/53873* (2013.01)

(58) Field of Classification Search
CPC ........ H02M 7/537–53873; H02M 7/483–4835
See application file for complete search history.

(56) References Cited

U.S. PATENT DOCUMENTS

2012/0195084 A1 8/2012 Norrga
2019/0165693 A1\* 5/2019 Malipaard ........... H02M 7/4835

FOREIGN PATENT DOCUMENTS

CN 103457501 A \* 12/2013
CN 104682404 A \* 6/2015
(Continued)

OTHER PUBLICATIONS

English translation of "CN104682751A Modular cascaded multi-level converter on basis of hybrid modulation of PAM and PWM" Yao Gang (Year: 2015).\*
(Continued)

*Primary Examiner* — Sisay G Tiku
(74) *Attorney, Agent, or Firm* — Buchanan Ingersoll & Rooney PC

(57) ABSTRACT

In one embodiment, a power conversion device that converts power between a DC circuit and an AC circuit includes a plurality of leg circuits connected in parallel between first and second DC terminals and electrically connected to the AC circuit. Each of the plurality of leg circuits includes at least one first converter cell and a plurality of second converter cells other than the first converter cell. A first control signal that controls switching of a semiconductor switching element included in at least one first converter cell is higher in frequency than a second control signal that controls switching of a semiconductor switching element included in each of the plurality of second converter cells.

15 Claims, 15 Drawing Sheets

(56) References Cited

FOREIGN PATENT DOCUMENTS

| | | | | |
|---|---|---|---|---|
| CN | 104682751 | A | * | 6/2015 |
| CN | 104682751 | B | | 7/2017 |
| CN | 111756264 | A | * | 10/2020 |
| CN | 111953222 | A | * | 11/2020 |
| JP | 2013507100 | A | | 2/2013 |
| WO | 2011042050 | A1 | | 4/2011 |

OTHER PUBLICATIONS

International Search Report (PCT/ISA/210) dated Apr. 3, 2018, by the Japan Patent Office as the International Searching Authority for International Application No. PCT/JP2018/000695.

Written Opinion (PCT/ISA/237) dated Apr. 3, 2018, by the Japan Patent Office as the International Searching Authority for International Application No. PCT/JP2018/000695.

Extended European Search Report dated Jan. 11, 2021 issued by the European Patent Office in corresponding European Patent Application No. 18899883.5 (9 pages).

* cited by examiner (A)

(B)

(C)

(A)

(B)

POWER CONVERSION DEVICE HAVING A FREQUENCY OF A FIRST CONTROL SIGNAL HIGHER THAN A FREQUENCY OF A SECOND CONTROL SIGNAL

TECHNICAL FIELD

The present disclosure relates to a power conversion device which converts power between an alternating current (AC) circuit and a direct current (DC) circuit and is used, for example, in a power system.

BACKGROUND ART

In a power conversion device of a large capacity installed in a power system in recent years, instead of a separately-excited converter including a thyristor as a switching element, a self-excited converter including an insulated gate bipolar transistor as a switching element has generally been used. A modular multilevel converter (MMC) represents the self-excited converter.

The modular multilevel converter includes a first arm connected to a DC terminal on a positive-electrode side and a second arm connected to a DC terminal on a negative-electrode side for each phase of a three-phase alternating current and each arm is configured with a plurality of converter cells (which are also referred to as sub modules or chopper cells) being cascaded. The first arm and the second arm of each phase implement a leg.

Japanese National Patent Publication No. 2013-507100 (PTL 1) discloses each leg configured with a first type of converter cell with unipolar voltage contribution capability and a second type of converter cell with bipolar voltage contribution capability. The first type of converter cell is, for example, a half-bridge converter cell and the second type of converter cell is, for example, a full-bridge converter cell. The first type of converter cell is used for a basic function for a conversion operation and the second type of converter cell is used for removal of a circulating current, removal and addition of a zero-phase third harmonic, and removal and addition of reactive power. The first type of converter cell and the second type of converter cell are controlled by a common control unit. The control unit generates a control signal based on pulse width modulation (PWM) that uses triangular carrier waves.

CITATION LIST

Patent Literature

PTL 1: Japanese National Patent Publication No. 2013-507100

SUMMARY OF INVENTION

Technical Problem

The inventors of the present application have studied about a method of enhancing control stability of an MMC when each leg is configured with a first group of converter cells and a second group of converter cells as in PTL 1. In particular, the inventors of the present application have studied about controllability of a group of converter cells that is not involved with a basic function for a conversion operation but is used for improvement in function of the MMC. The inventors of the present application have discussed a method allowing accurate control of a circulating current even though the group of converter cells includes a small number of converter cells, and derived the technique in the present disclosure. PTL 1 fails to mention such improvement in controllability of an MMC.

Therefore, an object of the present disclosure is to enhance controllability of a power conversion device under an MMC scheme including a plurality of groups of converter cells.

The present disclosure is not limited to the embodiment disclosed in PTL 1. For example, in a power conversion device according to the present disclosure, both of a first group and a second group may include half-bridge converter cells or full-bridge converter cells.

Solution to Problem

In one embodiment, a power conversion device that converts power between a DC circuit and an AC circuit includes a plurality of leg circuits connected in parallel between a first DC terminal and a second DC terminal and electrically connected to the AC circuit. Each of the plurality of leg circuits includes at least one first converter cell and a plurality of second converter cells other than the former. Each of the at least one first converter cell and the plurality of second converter cells includes a capacitor and a plurality of semiconductor switching elements. A first control signal that controls switching of each of the semiconductor switching elements included in the at least one first converter cell is higher in frequency than a second control signal that controls switching of each of the semiconductor switching elements included in each of the plurality of second converter cells.

Advantageous Effects of Invention

According to the embodiment, controllability of the power conversion device can be enhanced by setting a frequency of the first control signal to be higher than a frequency of the second control signal.

DESCRIPTION OF EMBODIMENTS

Figure 1:
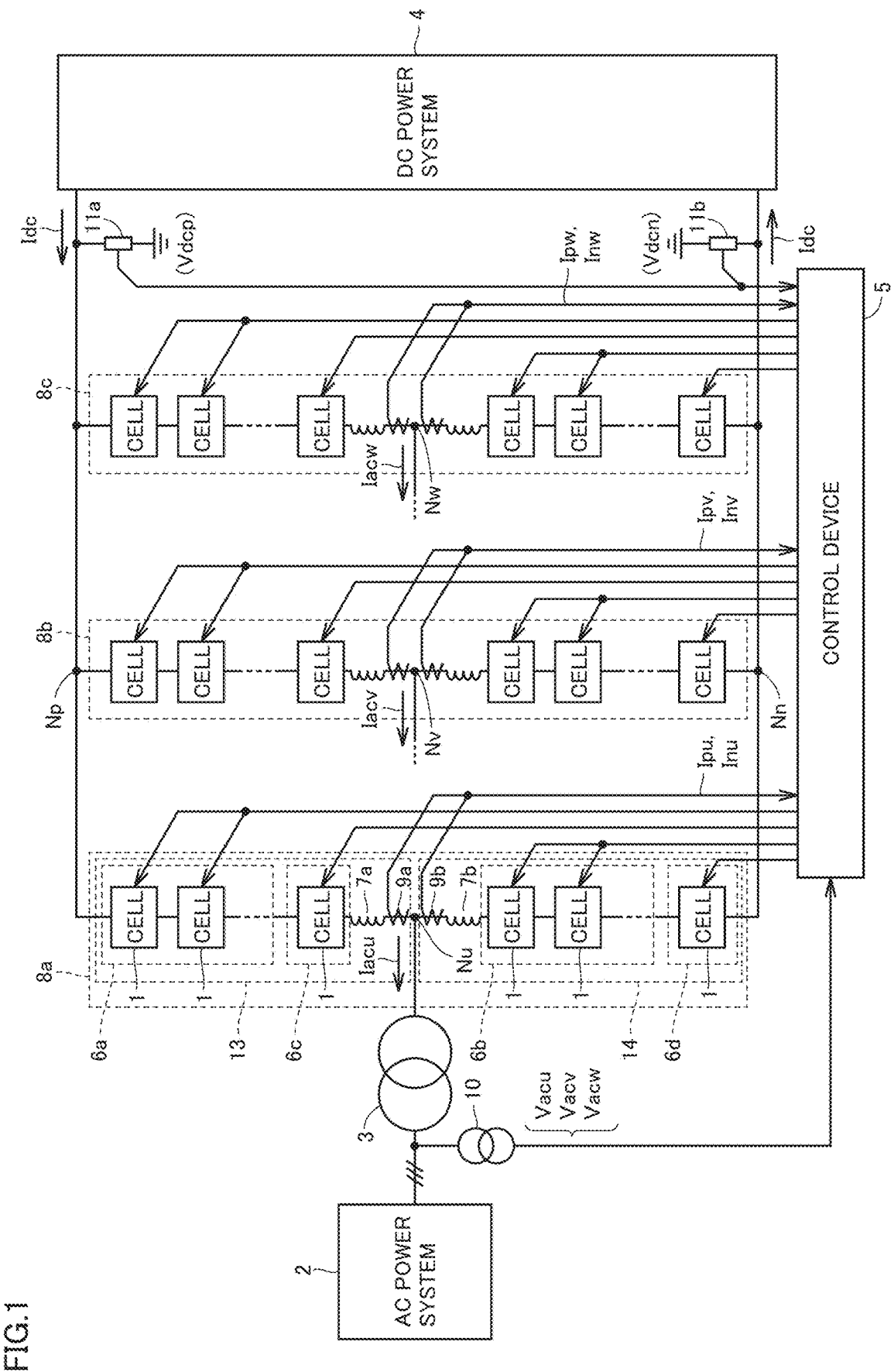
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

[Schematic Configuration of Power Conversion Device]

FIG. 1 is a schematic configuration diagram of a power conversion device according to a first embodiment. Referring to FIG. 1, the power conversion device includes leg circuits 8a, 8b, and 8c which are main circuits (which are denoted as a leg circuit 8 when they are collectively referred to or an unspecified one is referred to) and a control device 5 which controls these leg circuits 8.

Leg circuit 8 is provided for each of a plurality of phases implementing an alternating current and connected between an AC circuit 2 and a DC circuit 4, and converts power between these circuits. FIG. 1 shows three-phase AC circuit 2, and three leg circuits 8a, 8b, and 8c corresponding to a u phase, a v phase, and a w phase, respectively, are provided.

AC terminals Nu, Nv, and Nw provided in respective leg circuits 8a, 8b, and 8c are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3. DC terminals Np and Nn (a positive-side DC terminal Np and a negative-side DC terminal Nn) provided in common to leg circuits 8 are connected to DC circuit 4. DC circuit 4 is, for example, a DC power system including a DC power grid and another power conversion device which provides a DC output.

Instead of interconnected transformer 3 in FIG. 1, AC terminals Nu, Nv, and Nw may be connected to AC circuit 2 with an interconnected reactor being interposed. Instead of AC terminals Nu, Nv, and Nw, a primary winding may be provided in each of leg circuits 8a, 8b, and 8c, and leg circuits 8a, 8b, and 8c may be connected in an AC manner to interconnected transformer 3 or an interconnected reactor with a secondary winding magnetically coupled to the primary winding being interposed. In this case, the primary winding may be implemented by reactors 7a and 7b. Leg circuit 8 is electrically (in a DC or AC manner) connected to AC circuit 2 with a connection portion provided in each of leg circuits 8a, 8b, and 8c being interposed, such as AC terminals Nu, Nv, and Nw or the above-described primary winding.

Leg circuit 8a is divided into a positive-side arm (which is also referred to as an upper arm or a primary arm) 13 from positive-side DC terminal Np to AC input terminal Nu and a negative-side arm (which is also referred to as a lower arm or a secondary arm) 14 from negative-side DC terminal Nn to AC input terminal Nu. A point of connection Nu between positive-side arm 13 and negative-side arm 14 is connected to transformer 3. Positive-side DC terminal Np and negative-side DC terminal Nn are connected to DC circuit 4. Since leg circuits 8b and 8c are also similarly configured, leg circuit 8a will be described below as a representative.

Positive-side arm 13 includes a cell group 6a in which a plurality of converter cells 1 are cascaded, a cell group 6c in which a plurality of converter cells 1 are cascaded, and reactor 7a. Cell groups 6a and 6c and reactor 7a are connected in series to one another. For the sake of brevity, a converter cell may be referred to as a cell below. Though FIG. 1 shows only a single cell 1 in cell group 6c for facilitating illustration, a plurality of cells 1 are actually cascaded.

Similarly, negative-side arm 14 includes a cell group 6b in which a plurality of cells 1 are cascaded, a cell group 6d in which a plurality of cells 1 are cascaded, and reactor 7b. Cell groups 6b and 6d and reactor 7b are connected in series to one another. Though FIG. 1 shows only a single cell 1 in cell group 6d for facilitating illustration, a plurality of cells 1 are actually cascaded.

An example in which each cell 1 included in cell groups 6a and 6b is identical in configuration to each cell 1 included in cell groups 6c and 6d will mainly be described below. Unlike the former, each cell 1 included in cell groups 6a and 6b may be different in configuration from each cell 1 included in cell groups 6c and 6d. In any case, a function and effect is similar.

Reactor 7a may be inserted in any position in positive-side arm 13 of leg circuit 8a, and reactor 7b may be inserted in any position in negative-side arm 14 of leg circuit 8a. A plurality of reactors 7a and a plurality of reactors 7b may be provided. The reactors may be different in inductance value. Only reactor 7a of positive-side arm 13 or only reactor 7b of negative-side arm 14 may be provided.

Cell groups 6a and 6c provided in positive-side arm 13 are referred to as a positive-side cell group and cell groups 6b and 6d provided in negative-side arm 14 are referred to as a negative-side cell group. As will be described in detail below, positive-side cell group 6a and negative-side cell group 6b are without being used for control of a circulating current but are used only for control of an AC electric quantity and a DC electric quantity. Positive-side cell group 6c and negative-side cell group 6d are used for control of a circulating current. Control of a circulating current is characterized in that only at least one cell constituting each leg circuit 8 is used therefor.

The power conversion device in FIG. 1 further includes an AC voltage detector 10, DC voltage detectors 11a and 11b, and arm current detectors 9a and 9b provided in each leg circuit 8 as detectors which detect electric quantities (a current and a voltage) used for control. Signals detected by these detectors are input to control device 5.

Specifically, AC voltage detector 10 detects a U-phase voltage value Vacu, a V-phase voltage value Vacv, and a W-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 8a for the U phase detect an arm current Ipu which flows in positive-side arm 13 and an arm current Inu which flows in negative-side arm 14, respectively. Similarly, arm current detectors 9a and 9b provided in leg circuit 8b for the V phase detect a positive-side arm current Ipv and a negative-side arm current Inv, respectively. Arm current detectors 9a and 9b provided in leg circuit 8c for the W phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

[Configuration Example of Converter Cell]

Figure 2:
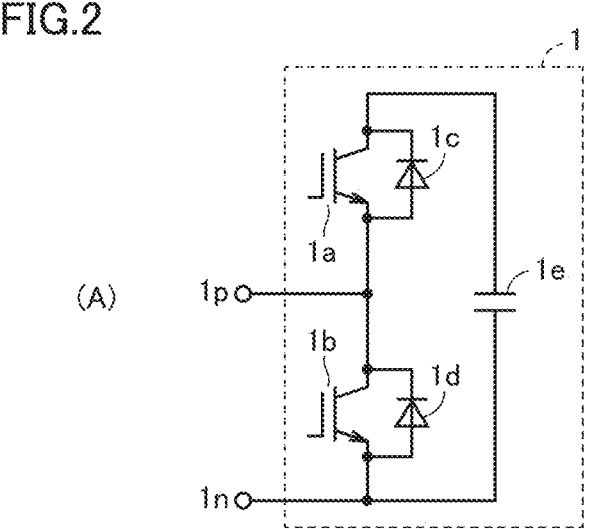
FIG. 2 is a circuit diagram showing one example of a converter cell included in each of groups 6a, 6b, 6c, and 6d.
Figure 2:
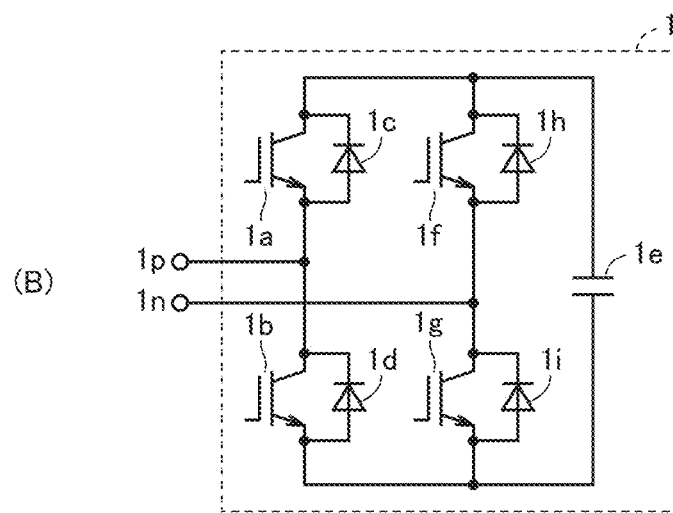
Figure 2:
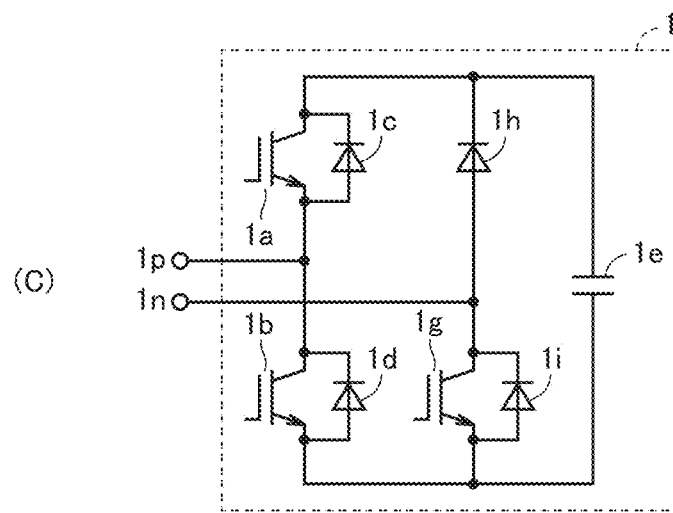

FIG. 2 is a circuit diagram showing one example of a converter cell constituting cell groups 6a, 6b, 6c, and 6d. Converter cell 1 shown in FIG. 2 (A) adopts a half-bridge configuration and includes semiconductor switching elements 1a and 1b (which may hereinafter simply be referred to as a switching element) connected in series to each other, diodes 1c and 1d, and a DC capacitor 1e as an energy storage. Diodes 1c and 1d are connected in anti-parallel (in parallel and in a direction of a reverse bias) to switching elements 1a and 1b, respectively. DC capacitor 1e is connected in parallel to a series connection circuit of switching elements 1a and 1b and smoothes a DC voltage. A connection node between switching elements 1a and 1b is connected to a positive-side input and output terminal 1p and a connection node between switching element 1b and DC capacitor 1e is connected to a negative-side input and output terminal 1n.

In the configuration in FIG. 2 (A), switching elements 1a and 1b are controlled such that one is turned on and the other is turned off. When switching element 1a is turned on and switching element 1b is turned off, a voltage across opposing ends of DC capacitor 1e is applied across input and output terminals 1p and 1n (a positive-side voltage being applied to input and output terminal 1p and a negative-side voltage being applied to input and output terminal 1n). In contrast, when switching element 1a is turned off and switching element 1b is turned on, 0 V is applied across input and output terminals 1p and 1n. Converter cell 1 shown in FIG. 2 (A) can output a zero voltage or a positive voltage (dependent on a voltage of DC capacitor 1e) by alternately turning on switching elements 1a and 1b. Diodes 1c and 1d are provided for protection when voltages in reverse directions are applied to switching elements 1a and 1b.

Converter cell 1 shown in FIG. 2 (B) adopts a full-bridge configuration and it is different from converter cell 1 in FIG. 2 (A) in further including switching elements 1f and 1g connected in series and diodes 1h and 1i connected in anti-parallel to switching elements 1f and 1g. Switching elements 1f and 1g as a whole are connected in parallel to the series connection circuit of switching elements 1a and 1b and connected in parallel to DC capacitor 1e. Input and output terminal 1p is connected to the connection node between switching elements 1a and 1b and input and output terminal 1n is connected to a connection node between switching elements 1f and 1g.

Converter cell 1 shown in FIG. 2 (B) is controlled such that switching element 1g is normally turned on, switching element 1f is normally turned off, and switching elements 1a and 1b are alternately turned on during a normal operation (that is, a zero voltage or a positive voltage is output across input and output terminals 1p and 1n). Converter cell 1 shown in FIG. 2 (B), however, can also output a zero voltage or a negative voltage by turning off switching element 1g, turning on switching element 1f, and alternately turning on switching elements 1a and 1b.

Converter cell 1 shown in FIG. 2 (C) is configured with switching element 1f having been removed from converter cell 1 of the full-bridge configuration shown in FIG. 2 (B) and it is otherwise the same as in FIG. 2 (B). A converter cell configured as in FIG. 2 (C) is herein referred to as a hybrid type.

Converter cell 1 in FIG. 2 (C) is controlled such that switching element 1g is normally turned on and switching elements 1a and 1b are alternately turned on during the normal operation (that is, a zero voltage or a positive voltage is output across input and output terminals 1p and 1n). Converter cell 1 shown in FIG. 2 (C) can output a negative voltage when switching elements 1a and 1g are turned off and switching element 1b is turned on so that a current flows from input and output terminal 1n toward input and output terminal 1p.

A self-turn-off switching element capable of control of both of an on operation and an off operation is employed for each of switching elements 1a, 1b, 1f, and 1g. For example, an insulated gate bipolar transistor (IGBT) or a gate commutated turn-off thyristor (GCT) is employed as switching elements 1a, 1b, 1f, and 1g.

[Hardware Configuration of Control Device]

Figure 3:
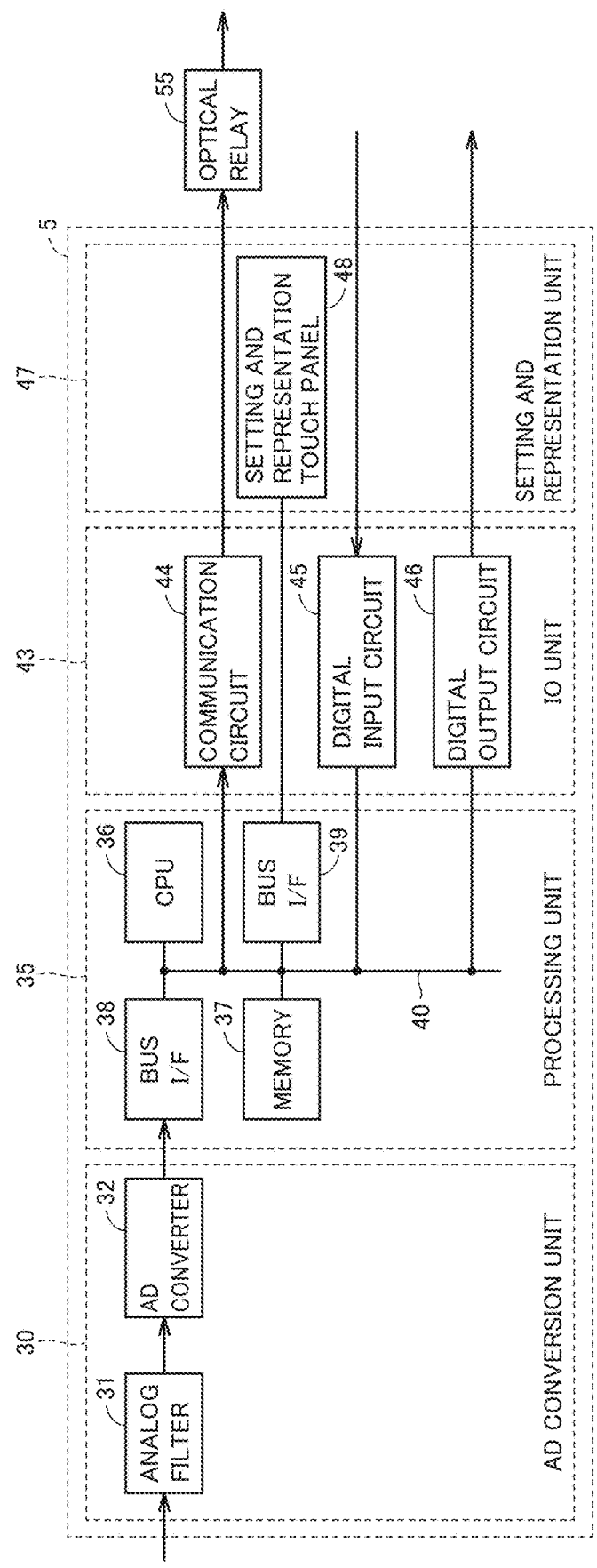
FIG. 3 is a block diagram showing an exemplary hardware configuration of a control device in FIG. 1.

FIG. 3 is a block diagram showing an exemplary hardware configuration of the control device in FIG. 1.

Control device 5 in FIG. 3 is configured similarly to what is called a digital relay. Specifically, referring to FIG. 3, control device 5 includes an analog-digital (AD) conversion unit 30, a processing unit 35, an input and output (IO) unit 43, and a setting and representation unit 47.

In a stage preceding AD conversion unit 30, a plurality of transformers (not shown) that convert input signals from arm current detectors 9a and 9b, AC voltage detector 10, and DC voltage detectors 11a and 11b to a voltage level suitable for signal processing in control device 5 may be provided.

AD conversion unit 30 includes an analog filter 31 and an AD converter 32. Analog filter 31 is implemented by a low pass filter provided to remove aliasing in AD conversion. AD converter 32 converts a signal that has passed through analog filter 31 to a digital value.

Though FIG. 3 representatively shows only one input channel of AD conversion unit 30, the AD conversion unit is actually in a multi-input configuration for receiving signals from detectors. Therefore, more specifically, AD conversion unit 30 includes a plurality of analog filters 31 and a multiplexer (not shown) for selection of signals that have passed through the plurality of analog filters 31.

Processing unit 35 includes a central processing unit (CPU) 36, a memory 37, bus interfaces 38 and 39, and a bus 40 that connects these components to one another. CPU 36 controls operations by control device 5 as a whole. Memory 37 is used as a main storage of CPU 36. Memory 37 stores a program and a set value for signal processing by containing a non-volatile memory such as a flash memory.

Processing unit 35 should only be implemented by a circuit with a processing function and is not limited to the example in FIG. 3. For example, processing unit 35 may include a plurality of CPUs. Processing unit 35 may be implemented by at least one application specific integrated circuit (ASIC) or at least one field programmable gate array (FPGA) instead of a processor such as the CPU. Alternatively, processing unit 35 may be implemented by combination of any of a processor, an ASIC, and an FPGA.

IO unit 43 includes a communication circuit 44, a digital input circuit 45, and a digital output circuit 46. Communication circuit 44 generates an optical signal for output to each converter cell 1. A signal output from communication circuit 44 is transmitted to each converter cell 1 through an optical relay 55. Digital input circuit 45 and digital output circuit 46 are interface circuits in establishing communication between CPU 36 and an external apparatus. For example, digital output circuit 46 outputs a trip signal to a circuit breaker (not shown) provided between an AC power system 2 and the power conversion device.

Setting and representation unit 47 includes a touch panel 48 for input and representation of a set value. Touch panel 48 is an input and output interface which is combination of a display such as a liquid crystal panel and an input apparatus such as a touch pad. Touch panel 48 is connected to bus 40 with bus interface 39 being interposed.

[Functional Configuration of Control Device and General Operation]

Figure 4:
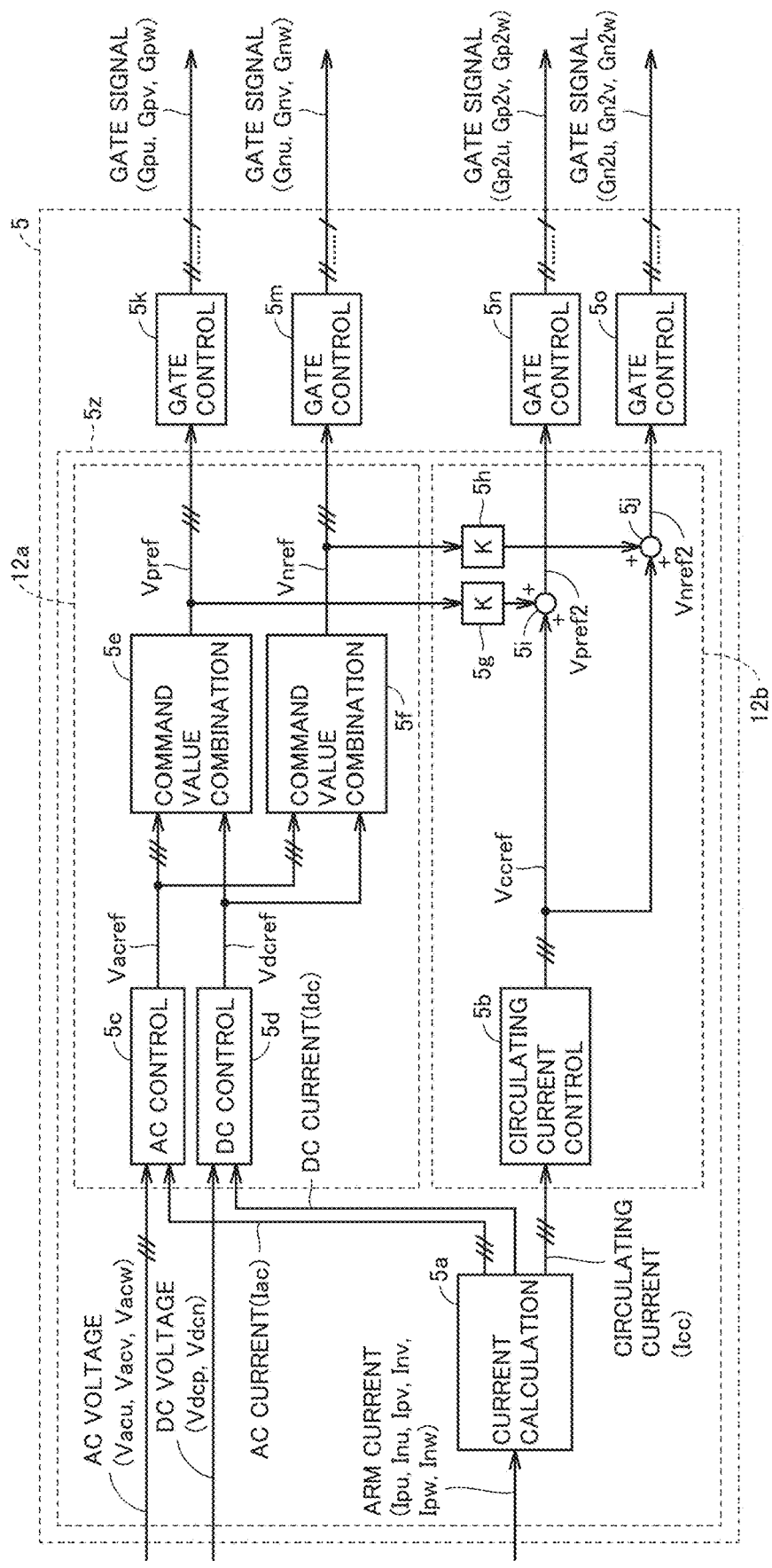
FIG. 4 is a block diagram showing a functional configuration of the control device in FIG. 1.

FIG. 4 is a block diagram showing a functional configuration of the control device in FIG. 1. A configuration of control device 5 and a general operation by each element will be described below with reference to FIGS. 1 and 4.

Control device 5 includes a voltage command value generation unit 5z and gate controllers 5k, 5m, 5n, and 5o. Gate controller 5k supplies gate signals Gpu, Gpv, and Gpw to each switching element constituting positive-side cell group 6a of leg circuits 8a, 8b, and 8c, respectively. Gate controller 5m supplies gate signals Gnu, Gnv, and Gnw to each switching element constituting negative-side cell group 6b of leg circuits 8a, 8b, and 8c, respectively. Gate controller 5n supplies gate signals Gp2u, Gp2v, and Gp2w to each switching element constituting positive-side cell group 6c for control of a circulating current of leg circuits 8a, 8b, and 8c, respectively. Gate controller 5o supplies gate signals Gn2u, Gn2v, and Gn2w to each switching element constituting negative-side cell group 6d for control of a circulating current of leg circuits 8a, 8b, and 8c, respectively.

Voltage command value generation unit 5z supplies voltage command values Vpref, Vnref, Vpref2, and Vnref2 to gate controllers 5k, 5m, 5n, and 5o, respectively. Voltage command values Vpref2 and Vnref2 supplied to respective gate controllers 5n and 5o for control of a circulating current are based on a detection value of a circulating current Icc. Voltage command values Vpref and Vnref supplied to other gate controllers 5k and 5m are not based on a detection value of circulating current Icc.

More specifically, voltage command value generation unit 5z includes a current calculator 5a, a circulating current controller 5b, an AC controller 5c, a DC controller 5d, command value combination units 5e and 5f, gain circuits 5g and 5h, and adders 5i and 5j.

Current calculator 5a takes in positive-side arm currents Ipu, Ipv, and Ipw detected by current detector 9a provided in positive-side arm 13 of leg circuit 8 of each phase and negative-side arm currents Inu, Inv, and Inw detected by current detector 9b provided in negative-side arm 14 of leg circuit 8 of each phase. Current calculator 5a calculates AC current values Iacu, Iacv, and Iacw, a DC current value Idc, and circulating current values Iccu, Iccv, and Iccw from the arm current which has been taken in. Current calculator 5a outputs calculated AC current values Iacu, Iacv, and Iacw to AC controller 5c, outputs calculated DC current value Idc to DC controller 5d, and outputs calculated circulating current values Iccu, Iccv, and Iccw to circulating current controller 5b.

U-phase AC current Iacu, V-phase AC current Iacv, and W-phase AC current Iacw (which are denoted as an AC current Iac when they are collectively referred to) which flow from AC terminals Nu, Nv, and Nw of each leg circuit 8 toward transformer 3 are defined as positive. DC current Idc which flows from DC circuit 4 toward positive-side DC terminal Np and from negative-side DC terminal Nn toward DC circuit 4 is defined as positive. Circulating currents Iccu, Iccv, and Iccw which flow through leg circuits 8a, 8b, and 8c, respectively (which are denoted as circulating current Icc when they are collectively referred to) from positive-side DC terminal Np toward negative-side DC terminal Nn are defined as positive.

AC voltage values Vacu, Vacv, and Vacw of the U phase, the V phase and the W phase (which are denoted as an AC voltage value Vac when they are collectively referred to) detected by AC voltage detector 10 are further input to AC controller 5c. AC controller 5c generates AC voltage command values Vacrefu, Vacrefv, and Vacrefw of the U phase, the V phase, and the W phase (which are denoted as an AC voltage command value Vacref when they are collectively referred to) based on input AC current value Iac and AC voltage value Vac.

DC voltage values Vdcp and Vdcn detected by DC voltage detectors 11a and 11b are further input to DC controller 5d. DC controller 5d generates a DC voltage command value Vdcref based on input DC voltage values Vdcp and Vdcn and DC current value Idc.

Command value combination unit 5e generates a voltage command value Vprefu for U-phase positive-side cell group 6a by combining U-phase AC voltage command value Vacrefu and DC voltage command value Vdcref with each other. Similarly, command value combination unit 5e generates a voltage command value Vprefv for V-phase positive-side cell group 6a by combining V-phase AC voltage command value Vacrefv and DC voltage command value Vdcref with each other. Command value combination unit 5e further generates a voltage command value Vprefw for W-phase positive-side cell group 6a by combining W-phase AC voltage command value Vacrefw and DC voltage command value Vdcref with each other. Generated voltage command values Vprefu, Vprefv, and Vprefw (which are denoted as voltage command value Vpref when they are collectively referred to or an unspecified voltage command value is referred to) is input to gate controller 5k.

Command value combination unit 5f generates a voltage command value Vnrefu for U-phase negative-side cell group 6b by combining U-phase AC voltage command value Vacrefu and DC voltage command value Vdcref with each other. Similarly, command value combination unit 5f generates a voltage command value Vnrefv for V-phase negative-side cell group 6b by combining V-phase AC voltage command value Vacrefv and DC voltage command value Vdcref with each other. Command value combination unit 5f further generates a voltage command value Vnrefw for W-phase negative-side cell group 6b by combining W-phase AC voltage command value Vacrefw and DC voltage command value Vdcref with each other. Generated voltage command values Vnrefu, Vnrefv, and Vnrefw (which are denoted as voltage command value Vnref when they are collectively referred to or an unspecified voltage command value is referred to) are input to gate controller 5m.

Circulating current controller 5b generates voltage command values Vccrefu, Vccrefv, and Vccrefw (which are denoted as a voltage command value Vccref when they are collectively referred to or an unspecified voltage command value is referred to) for control of a circulating current of each phase based on respective circulating current values Iccu, Iccv, and Iccw. Generated voltage command value Vccref for control of a circulating current of each phase is added in adder 5i for each phase to voltage command value Vpref for positive-side cell group 6a which has been multiplied by a gain K. Consequently, a voltage command value Vpref2 for positive-side cell group 6c for control of a circulating current is generated and generated voltage command value Vpref2 is supplied to gate controller 5n. Similarly, generated voltage command value Vccref for control of a circulating current of each phase is added in adder 5j for each phase to voltage command value Vnref for negative-side cell group 6b which has been multiplied by gain K. Consequently, voltage command value Vnref2 for negative-side cell group 6d for control of a circulating current is generated and generated voltage command value Vnref2 is supplied to gate controller 5o.

When a half-bridge converter cell shown in FIG. 2 (A) is employed as converter cell 1 included in cell groups 6c and 6d for control of a circulating current, a voltage command value is added by adders 5i and 5j. This is because a cell of a half bridge type is able to output only a zero voltage or a positive voltage, and in order to increase or lower an output voltage of converter cell 1 with increase and lowering in circulating current, the output voltage should be increased or lowered with a certain voltage value being defined as the reference. When the voltage defined as the reference is fixed to a constant value, however, capacitor 1e is undesirably continuously charged with DC current Idc that flows between DC circuit 4 and leg circuit 8. In order to avoid this problem, voltage command values Vpref2 and Vnref2 for controlling cell groups 6c and 6d are generated by addition of a reference voltage which is K times as large as voltage command values Vpref and Vnref for cell groups 6a and 6b to voltage command value Vccref for circulating current control, respectively. A voltage of capacitor 1e in each converter cell 1 included in cell groups 6c and 6d can thus be maintained at a constant value.

Proportional gain K is set to any value that will not saturate an output voltage of converter cell 1 when voltage command value Vccref for circulating current control is provided. When a full-bridge converter cell shown in FIG. 2 (B) is employed as converter cell 1 included in cell groups 6c and 6d for circulating current control, the reference voltage can be set to 0 and hence proportional gain K can be set to 0.

[Operations of Gate Controller]

Figure 5:
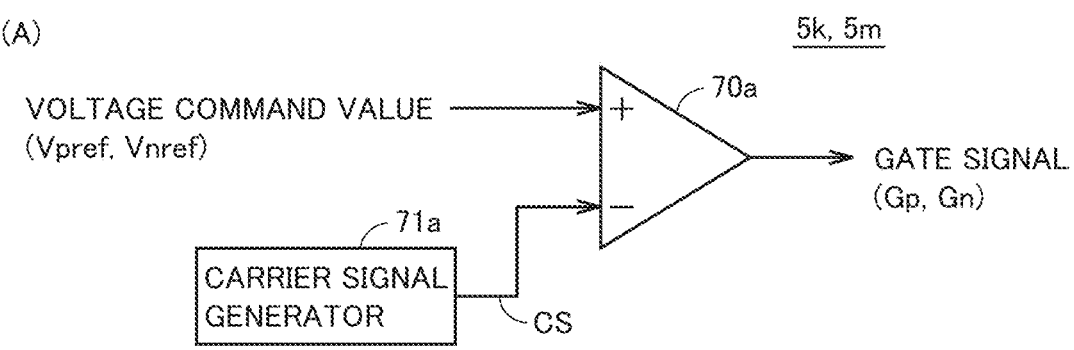
FIG. 5 is a functional block diagram showing a detailed operation by a gate controller in FIG. 4.
Figure 5:
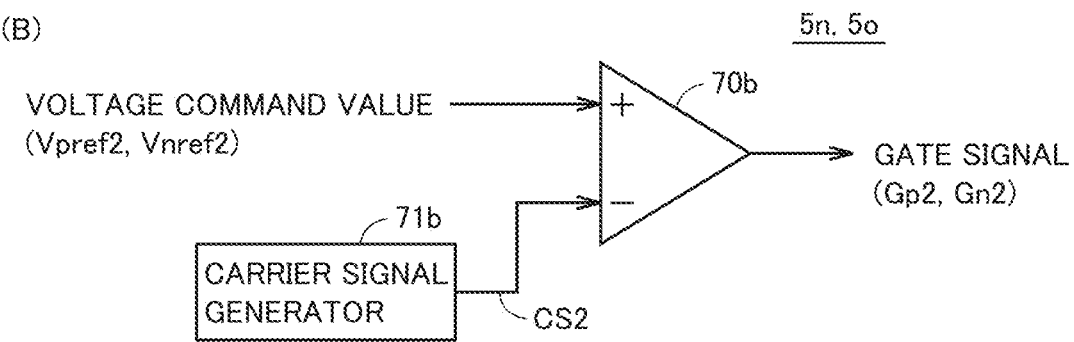

FIG. 5 is a functional block diagram showing a detailed operation of a gate controller in FIG. 4. FIG. 5 (A) shows a functional block diagram of gate controllers 5k and 5m and FIG. 5 (B) shows a functional block diagram of operations of gate controllers 5n and 5o.

(Operation of Gate Controllers 5k and 5m)

As described with reference to FIG. 4, gate controller 5k provides corresponding gate signals Gpu, Gpv, and Gpw to the switching element of cell 1 constituting positive-side cell group 6a of each phase based on voltage command values Vprefu, Vprefv, and Vprefw of the U phase, the V phase, and the W phase combined by command value combination unit 5e. Gate controller 5m provides corresponding gate signals Gnu, Gnv, and Gnw to the switching element of cell 1 constituting negative-side cell group 6b of each phase based on voltage command values Vnrefu, Vnrefv, and Vnrefw of the U phase, the V phase, and the W phase combined by command value combination unit 5f.

For example, in half-bridge cell 1 shown in FIG. 2 (A), switching element 1a is turned on and switching element 1b is turned off when a voltage of DC capacitor 1e is output. When a zero voltage is output, in contrast, switching element 1a is turned off and switching element 1b is turned on. A pulse width modulation (PWM) scheme is employed in the present embodiment as a scheme for controlling a converter which can output a binary voltage level. Under the pulse width modulation scheme, a pulse width of a gate signal supplied to a switching element is controlled such that a DC component of a desired voltage or an AC component of a fundamental wave can be output in a time average manner.

Referring to FIG. 5 (A), each of gate controllers 5k and 5m for arm voltage control includes a comparator 70a and a carrier signal generator 71a. Carrier signal generator 71a generates, for example, a triangular carrier signal CS. Comparator 70a compares voltage command value Vpref or Vnref (which is denoted as a voltage command value Vref when voltage command values are collectively referred to) with carrier signal CS, and generates such a signal as attaining to the high level when voltage command value Vref is larger than carrier signal CS and attaining to the low level when voltage command value Vref is equal to or smaller than carrier signal CS, that is, a gate signal Gp or Gn.

Figure 6:
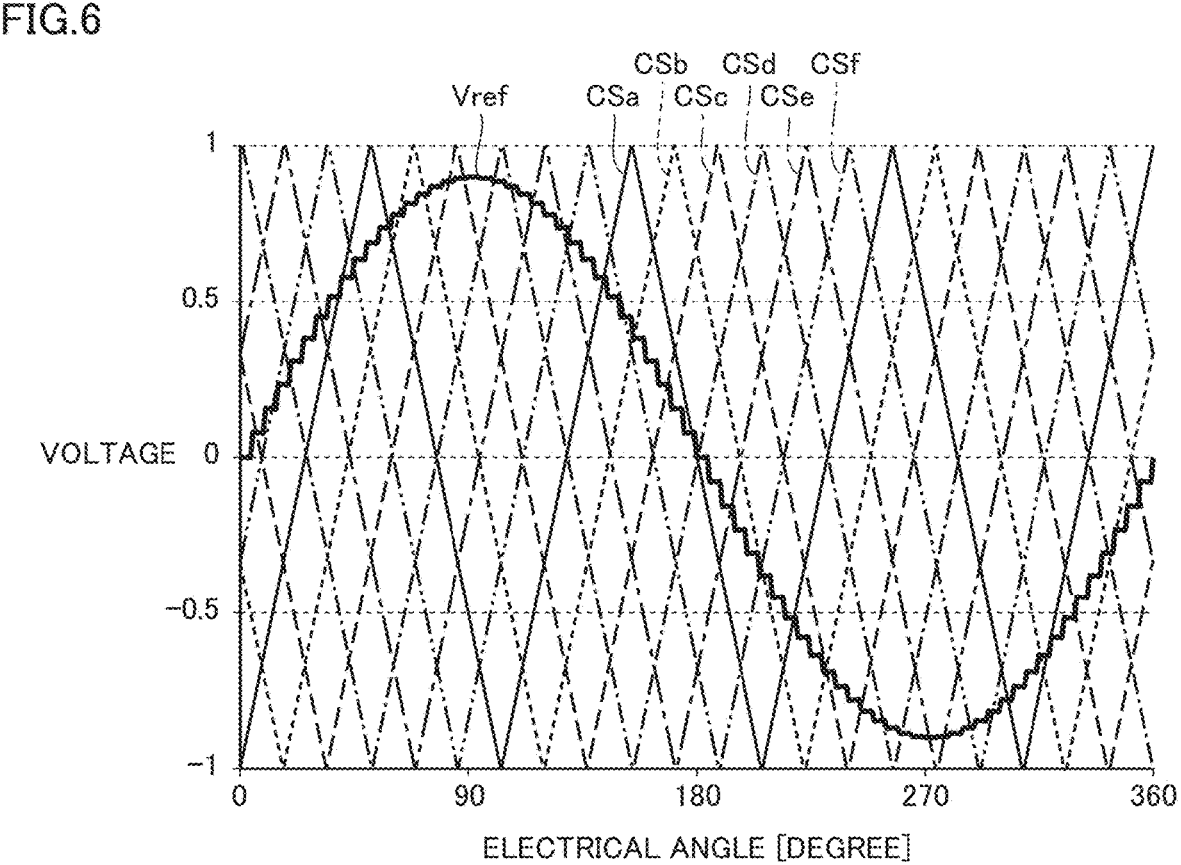
FIG. 6 is a schematic timing chart showing one example of a voltage command value and a carrier signal in FIG. 5 (A).

FIG. 6 is a schematic timing chart showing one example of a voltage command value and a carrier signal in FIG. 5 (A).

FIG. 6 shows exemplary carrier signals CSa to CSf under a phase shift PWM scheme when converter cell groups 6a and 6b for voltage control in each arm circuit include converter cells in six stages. The phase shift PWM scheme reduces a harmonic component of a combined voltage by shifting timing of a PWM signal output to each converter cell.

FIG. 6 further shows exemplary voltage command value Vref output from command value combination unit 5e or 5f in FIG. 4. A jagged shape like steps in accordance with a control processing cycle of command value combination unit 5e or 5f is observed in a waveform of voltage command value Vref. Therefore, as the control processing cycle is shorter, a smoother shape like a sinusoidal wave is obtained.

Carrier signal CS generated by carrier signal generator 71a in FIG. 5 should have a frequency of magnitude of a non-integral multiple of a fundamental frequency of the AC power system, in order to suppress variation in voltage of a capacitor in each converter cell. Carrier signal CS desirably has a frequency of magnitude between three times and four times as high as the fundamental frequency of the AC power system. When carrier signal CS has a frequency equal to or lower than three times as high as the fundamental frequency of the AC power system, control responsiveness is poorer and balance of a capacitor voltage among converter cells included in the arm is lost. When carrier signal CS has a frequency at least four times as high as the fundamental frequency of the AC power system, switching loss increases. In FIG. 6, the frequency of carrier signal CS is set to 3.5 times as high as the frequency of voltage command value Vref.

(Operation of Gate Controllers 5n and 5o)

Gate controller 5n provides corresponding gate signals Gp2u, Gp2v, and Gp2w to the switching element of cell 1 constituting positive-side cell group 6c of the corresponding phase based on voltage command values Vpref2u, Vpref2v, and Vpref2w of the U phase, the V phase, and the W phase output from adder 5i. Gate controller 5o provides corresponding gate signals Gn2u, Gn2v, and Gn2w to the switching element of cell 1 constituting negative-side cell group 6d of each phase based on voltage command values Vnref2u, Vnref2v, and Vnref2w of the U phase, the V phase, and the W phase output from adder 5j. Gate controllers 5n and 5o are operated under the pulse width modulation scheme similarly to gate controllers 5k and 5m.

Specifically, referring to FIG. 5 (B), each of gate controllers 5n and 5o for circulating current control includes a comparator 70b and a carrier signal generator 71b. Carrier signal generator 71b generates a triangular carrier signal CS2. Comparator 70b compares voltage command value Vpref2 or Vnref2 (which is denoted as a voltage command value Vref2 when voltage command values are collectively referred to) with carrier signal CS2, and generates such a signal as attaining to the high level when voltage command value Vref2 is larger than carrier signal CS2 and attaining to the low level when voltage command value Vref2 is equal to or smaller than carrier signal CS2, that is, a gate signal Gp2 or Gn2.

Figure 7:
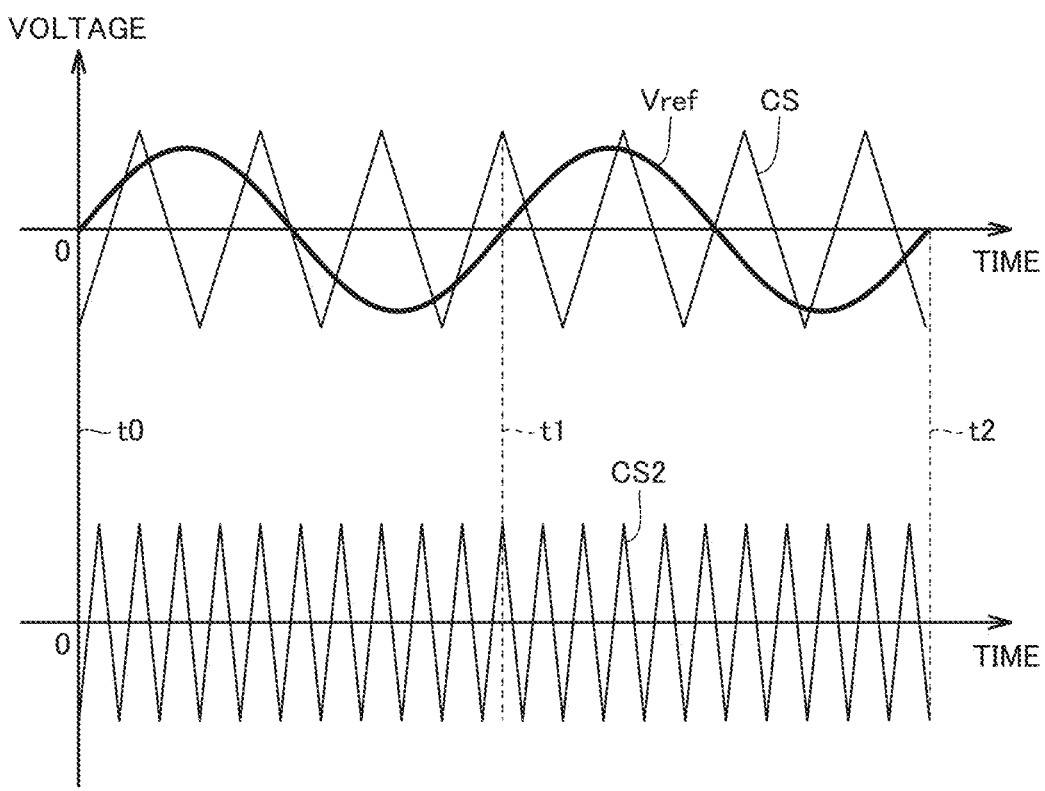
FIG. 7 is a schematic timing chart showing one example of a voltage command value and a carrier signal in FIG. 5 (A) and one example of a carrier signal in FIG. 5 (B).

FIG. 7 is a schematic timing chart showing one example of a voltage command value and a carrier signal in FIG. 5 (A) and one example of a carrier signal in FIG. 5 (B).

Though the number of pulses of a PWM signal for arm voltage control is restricted as described previously, the number of pulses of a PWM signal for circulating current control does not have to similarly be restricted. Since a function to control a circulating current is used in particular for balancing an arm voltage and an arm current of each phase within a power converter in a steady state, control stability is enhanced by quickly switching a control command value. For example, when balance of three-phase alternating current is suddenly lost due to occurrence of an AC system accident, higher control responsiveness provides higher followability to such an accidental phenomenon and hence control is further stabilized.

Then, a frequency of carrier signal CS2 used in gate controllers 5n and 5o for circulating current control is set to a value higher than a frequency of carrier signal CS used in gate controllers 5k and 5m for arm voltage control.

Specifically, in the example in FIG. 7, the frequency of carrier signal CS shown in FIG. 7 is set to 3.5 times as high as the fundamental frequency of the AC power system (equal to the frequency of voltage command value Vref). The frequency of carrier signal CS2 shown in FIG. 7 is set to 10.5 times as high as the fundamental frequency of the AC power system. In FIG. 7, a time period from time t0 to time t1 and a time period from time t1 to time t2 each correspond to one cycle of the AC power system. A period of one cycle includes pulses of 3.5 carrier signals CS and pulses of 10.5 carrier signals CS2.

[Effect]

As set forth above, in the power conversion device in the first embodiment, leg circuit 8 corresponding to each phase of three-phase alternating current is provided with cell groups 6a and 6b used for arm voltage control and cell groups 6c and 6d used for a purpose other than arm voltage control (for example, circulating current control). A frequency of a PWM signal for control of each converter cell 1 included in cell groups 6c and 6d is set to a value higher than a frequency of a PWM signal for control of each converter cell 1 included in cell groups 6a and 6b. Thus, even though the number of converter cells 1 included in cell groups 6c and 6d is small, circulating current controllability can be enhanced.

Depending on magnitude of a DC voltage or an AC voltage to be output, a necessary number of converter cells and spare converter cells are provided as converter cells 1 included in cell groups 6a and 6b such that a voltage applied to each converter cell 1 does not exceed a rated voltage.

[Modification]

An example in which gate controllers 5k, 5m, 5n, and 5o are provided in control device 5 is described with reference to FIG. 4. In contrast, gate controller 5k, 5m, 5n, or 5o may be provided in converter cell 1 included in corresponding one of cell groups 6a, 6b, 6c, and 6d. In this case, voltage command value generation unit 5z in FIG. 4 transmits voltage command values Vpref and Vnref to each converter cell 1 included in corresponding one of cell groups 6a and 6b and transmits voltage command values Vpref2 and Vnref2 to each converter cell 1 included in corresponding one of cell groups 6c and 6d. A configuration of converter cell 1 in this case will now be described.

Figure 8:
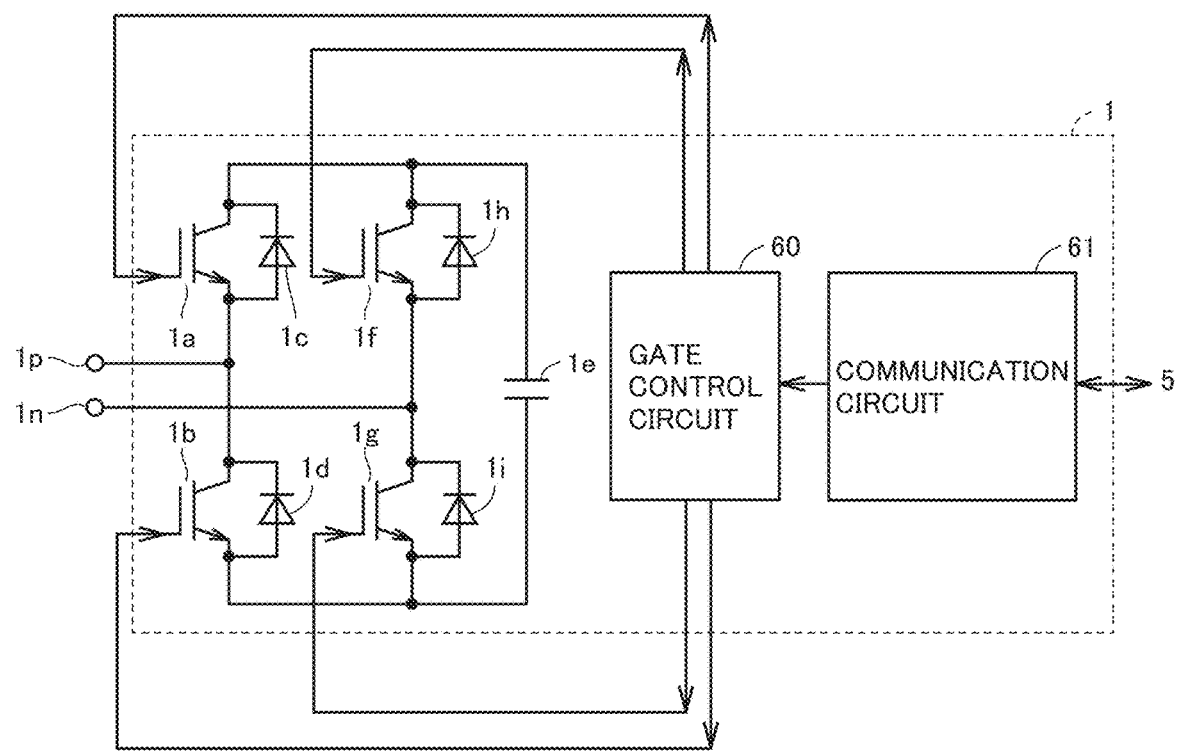
FIG. 8 is a circuit diagram showing a modification of the converter cell in FIG. 2 (B) in the first embodiment.

FIG. 8 is a circuit diagram showing a modification of the converter cell in FIG. 2 (B) in the first embodiment. The converter cells in FIG. 2 (A) and (C) can also similarly be modified.

Converter cell 1 in FIG. 8 is different from converter cell 1 in FIG. 2 (B) in further including a gate control circuit 60 and a communication circuit 61. Communication circuit 61 receives a corresponding voltage command value among voltage command values Vpref, Vnref, Vpref2, and Vnref2 by communicating with communication circuit 44 of control device 5 shown in FIG. 3.

Gate control circuit 60 corresponds to any of gate controllers 5k, 5m, 5n, and 5o in FIG. 4. Gate control circuit 60 outputs a gate signal in accordance with the voltage command value received through communication circuit 61. Specifically, as described with reference to FIG. 5, a PWM signal is generated based on comparison of the voltage command value with carrier signal CS or CS2.

Control device 5 and converter cell 1 according to the configuration in the modification also achieve an effect the same as in the configuration in FIG. 4 described previously.

[Second Modification]

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate controller 5n, adder 5i, and gain circuit 5g associated therewith are not required either, which is advantageous in simplification of the configuration of control device 5. Similarly, when only reactor 7a on the positive side is provided, negative-side cell group 6d for control of a circulating current is not required and gate controller 5o, adder 5j, and gain circuit 5h associated therewith are not required either, which is advantageous in simplification of the configuration of control device 5.

Second Embodiment

In a second embodiment, an example in which a control device for arm voltage control and a control device for a purpose other than arm voltage control (for example, circulating current control) are separate from each other will be described.

[Schematic Configuration of Power Conversion Device]

Figure 9:
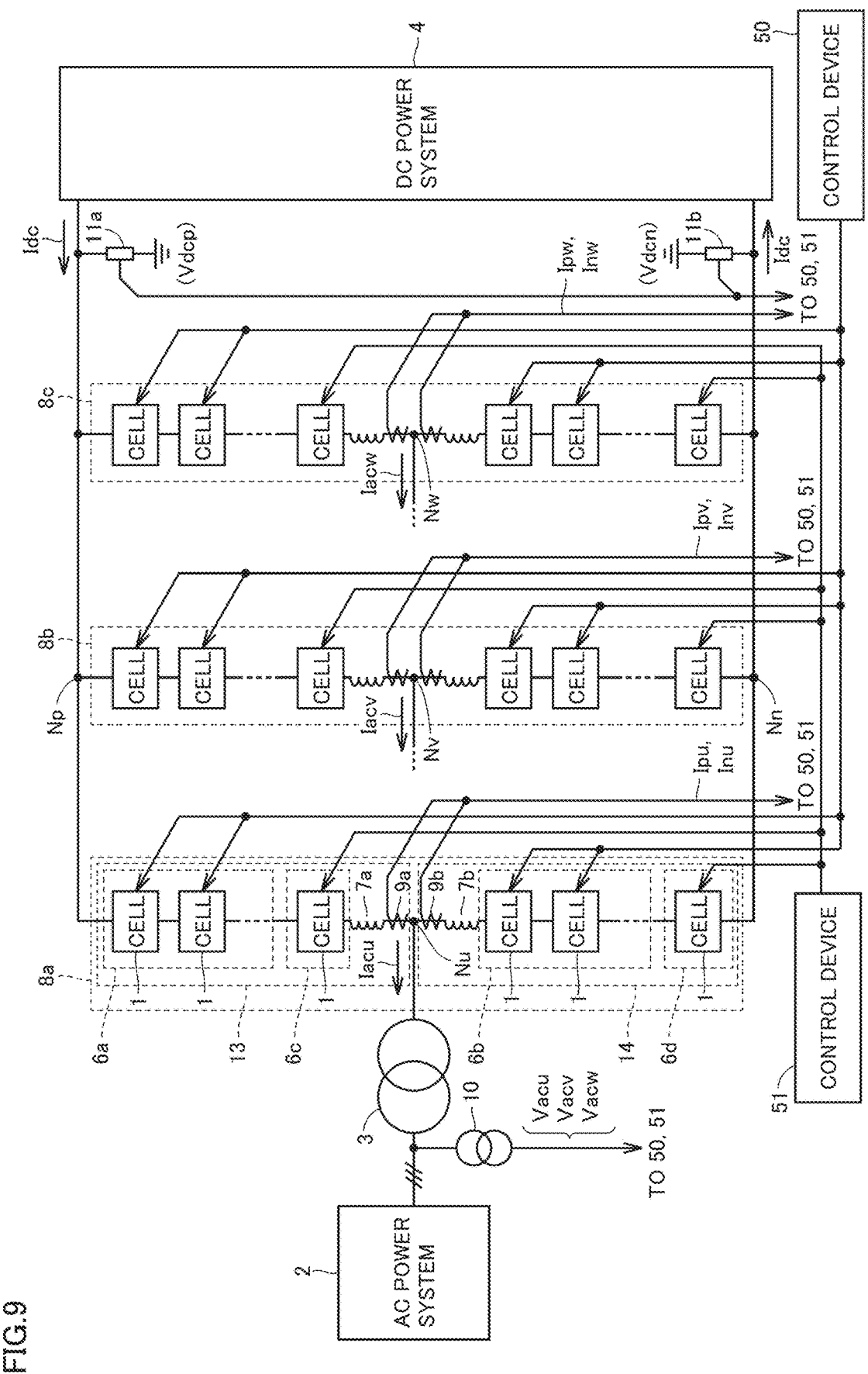
FIG. 9 is a schematic configuration diagram of a power conversion device according to a second embodiment.

FIG. 9 is a schematic configuration diagram of a power conversion device according to the second embodiment. The power conversion device in FIG. 9 is different from the power conversion device in FIG. 1 in including a control device 50 that controls cell groups 6a and 6b and a control device 51 that controls cell groups 6c and 6d.

Each of control device 50 and control device 51 includes, for example, the hardware configuration in FIG. 3. From a point of view of functions, functions of control device 5 in FIG. 1 are shared between control device 50 and control device 51. Specifically, control device 50 and control device 51 perform functions shown in functional block diagrams in FIGS. 10 and 11, respectively.

Figure 10:
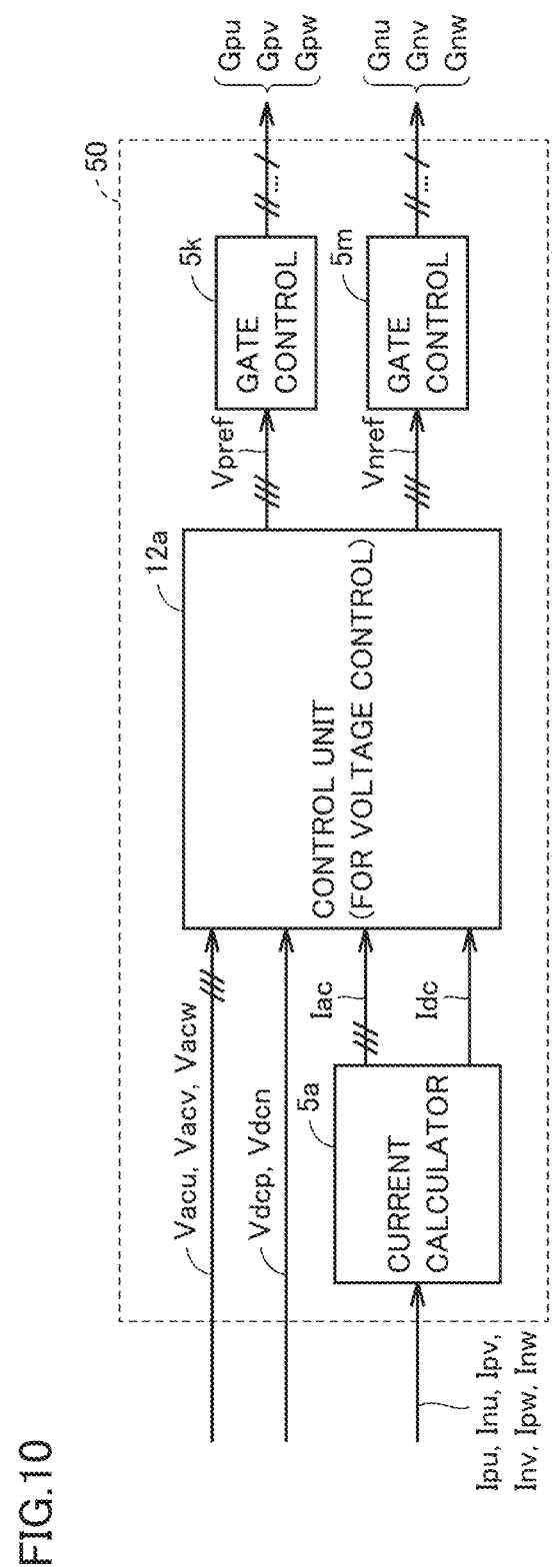
FIG. 10 is a block diagram showing a functional configuration of a control device 50 in FIG. 9.

FIG. 10 is a block diagram showing a functional configuration of control device 50 in FIG. 9. Referring to FIG. 10, control device 50 in FIG. 9 includes current calculator 5a in FIG. 4, a control unit 12a for arm voltage control, and gate controllers 5k and 5m.

Current calculator 5a calculates AC current value Iac and DC current value Idc based on arm currents Ip and In of each phase.

Control unit 12a includes AC controller 5c, DC controller 5d, and command value combination units 5e and 5f in FIG. 4. Control unit 12a generates voltage command values Vpref and Vnref based on AC voltage values Vacu, Vacv, and Vacw of respective phases detected by AC voltage detector 10 in FIG. 1, DC voltage values Vdcp and Vdcn detected by DC voltage detectors 11a and 11b, and AC current value Iac and DC current value Idc calculated by current calculator 5a.

Figure 11:
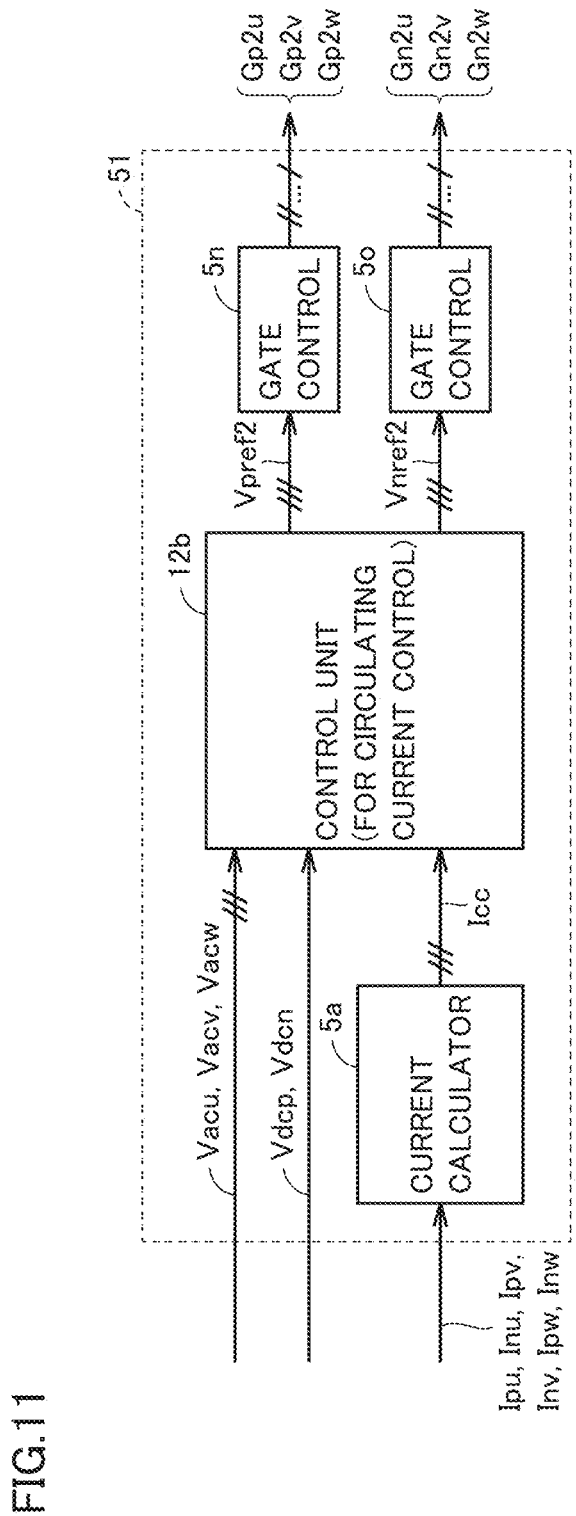
FIG. 11 is a block diagram showing a functional configuration of a control device 51 in FIG. 9.

FIG. 11 is a block diagram showing a functional configuration of control device 51 in FIG. 9. Referring to FIG. 11, control device 51 in FIG. 9 includes current calculator 5a in FIG. 4, a control unit 12b for circulating current control, and gate controllers 5n and 5o.

Current calculator 5a calculates circulating current value Icc based on arm currents Ip and In of each phase.

Control unit 12b includes circulating current controller 5b, gain circuits 5g and 5h, and adders 5i and 5j in FIG. 4. When each converter cell in cell groups 6c and 6d is implemented by a full-bridge converter cell in FIG. 2 (B), gain circuits 5g and 5h and adders 5i and 5j do not have to be provided. Control unit 12b generates voltage command values Vpref2 and Vnref2 based on circulating current value Icc calculated by current calculator 5a.

Since the power conversion device in FIG. 9 is otherwise the same in configuration as in FIG. 1, the same or corresponding elements have the same reference characters allotted and description will not be repeated.

[Operations of Control Device and Effect Thereof in Second Embodiment]

Figure 12:
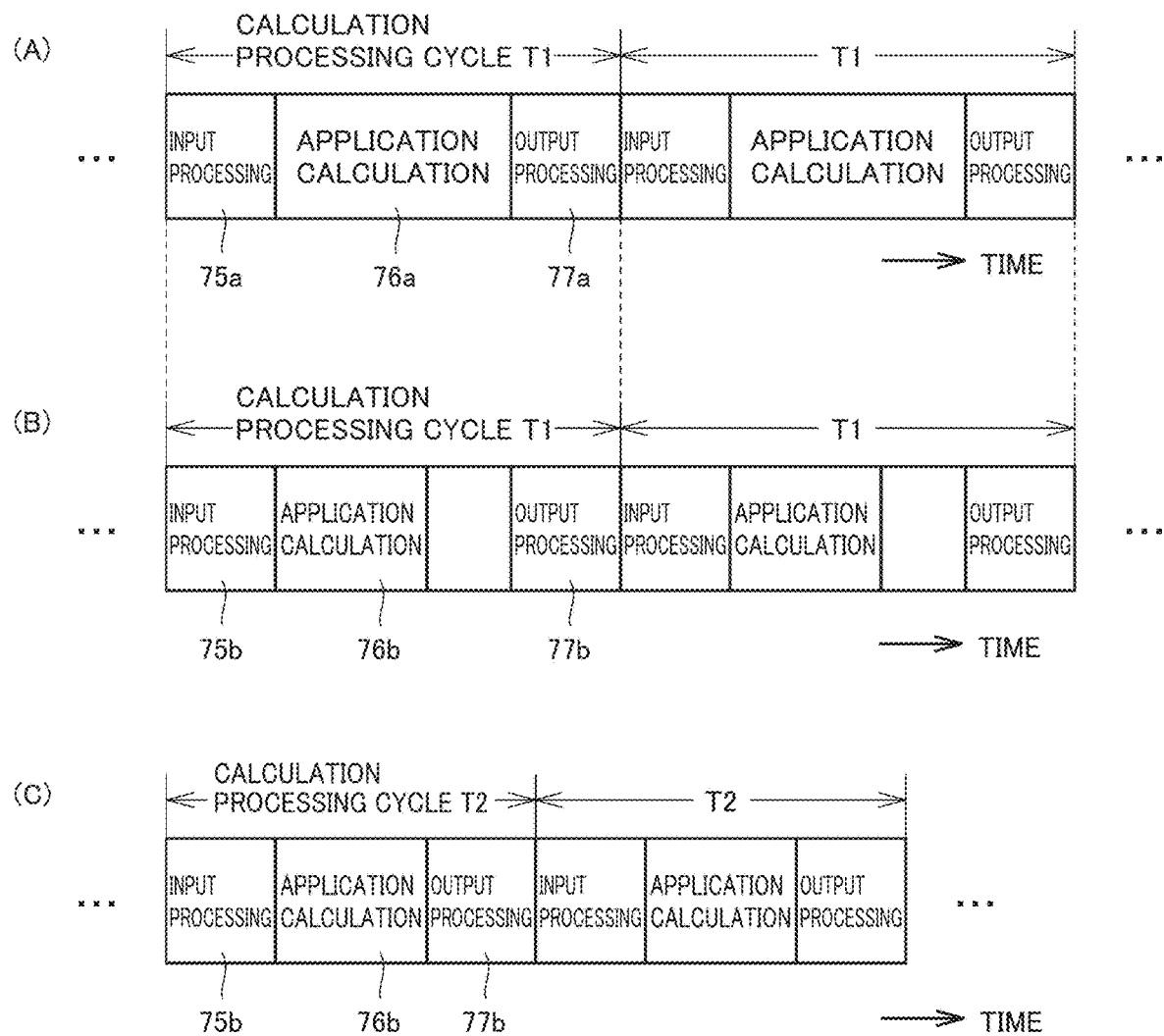
FIG. 12 is a schematic timing chart showing contents of processing by a CPU that implements control devices 50 and 51 in FIG. 9.

FIG. 12 is a schematic timing chart showing contents of processing by a CPU that implements control devices 50 and 51 in FIG. 9. FIG. 12 (A) is a schematic timing chart showing contents of processing by control device 50 and FIG. 12 (C) is a schematic timing chart showing inside of processing by control device 51. FIG. 12 (B) is a timing chart when control device 50 performs contents of processing by control device 51.

Referring to FIG. 12 (A), control device 50 performs processing 75a for converting an input signal into a signal for application calculation (which is referred to as input processing 75a below) and thereafter performs application calculation 76a (which is abbreviated as application calculation 76a).

In application calculation 76a, control device 50 calculates AC current value Iac and DC current value Idc based on arm current values Ip and In of each phase. Control device 50 further generates voltage command values Vpref and Vnref based on AC voltage values Vacu, Vacv, and Vacw of respective phases, DC voltage values Vdcp and Vdcn detected by DC voltage detectors 11a and 11b, and calculated AC current value Iac and DC current value Idc. Control device 50 further generates gate signals Gp and Gn of each phase based on voltage command values Vpref and Vnref.

Thereafter, control device 50 performs processing for converting generated gate signals Gp and Gn of each phase into an output signal (which is referred to as output processing 77a below). A processing time period for input processing 75a, application calculation 76a, and output processing 77a correspond to a calculation processing cycle T1. Such calculation is repeated thereafter.

Referring to FIG. 12 (B), when control device 50 performs contents of processing by control device 51 (the same as the operations by control device 5 in FIG. 1), input processing 75b, application calculation 76b, and output processing 77b are performed in identical calculation processing cycle T1. Input processing 75b and output processing 77b are processing similar to input processing 75a and output processing 77a, respectively.

In application calculation 76b, control device 51 calculates circulating current value Icc based on arm current values Ip and In of each phase. Control device 51 further generates voltage command values Vpref2 and Vnref2 based on calculated circulating current value Icc. Control device 51 further generates gate signals Gp2 and Gn2 of each phase based on voltage command values Vpref2 and Vnref2. Since application calculation 76b is thus easier in calculation contents than application calculation 76a, application calculation 76b is shorter in calculation time period than application calculation 76a.

Referring to FIG. 12 (C), by providing control device 51 dedicated for application calculation 76b separately from control device 50, a calculation processing cycle T2 can be shorter than calculation processing cycle T1. Since a cycle of update of voltage command values Vpref2 and Vnref2 is consequently shorter, stability in control of a circulating current or the like can be improved.

A CPU that implements control device 51 may be changed to a CPU higher in calculation capability than a CPU of control device 50. Instead of the CPU, a programmable logic device (PLD) such as an FPGA may be employed for control device 51. By employing the programmable logic device, calculation capability of control device 51 can be enhanced. Therefore, even though the number of converter cells 1 included in each of cell groups 6c and 6d is small, ability to control a circulating current or the like can be enhanced.

As described in the first embodiment, by setting a frequency of gate signals Gp2 and Gn2 for controlling cell groups 6c and 6d to be higher than a frequency of gate signals Gp and Gn for controlling cell groups 6a and 6b, circulating current controllability can further be enhanced.

[First Modification]

A plurality of CPUs may be provided in control device 5 in FIG. 1, at least one first CPU may perform the function of control device 50 in FIG. 10, and at least one second CPU different from the first CPU may perform the function of control device 51 in FIG. 11. A PLD may be employed instead of the second CPU. A function and effect the same as in the second embodiment is achieved also by providing hardware components separate from each other in an identical control device.

[Second Modification]

As described with reference to FIG. 8, gate controller 5k, 5m, 5n, or 5o may be provided in converter cell 1 included in corresponding one of cell groups 6a, 6b, 6c, and 6d. In this case, control device 50 in FIG. 9 transmits voltage command value Vpref or Vnref to converter cell 1 included in corresponding one of cell groups 6a, 6b, 6c, and 6d. Control device 51 transmits Vpref2 and Vnref2 to converter cell 1 included in corresponding one of cell groups 6c and 6d. The configuration of converter cell 1 in this case is the same as described with reference to FIG. 8.

Third Embodiment

In a third embodiment, an example in which a full-bridge converter cell is employed as a converter cell included in cell groups 6c and 6d of the power conversion device in FIG. 1 so as to control a circulating current and a voltage of a capacitor will be described. Description will be given below assuming that the overall configuration of the power conversion device is the same as described with reference to FIG. 1.

[Configuration of Cell 1 Included in Cell Groups 6c and 6d]

Figure 13:
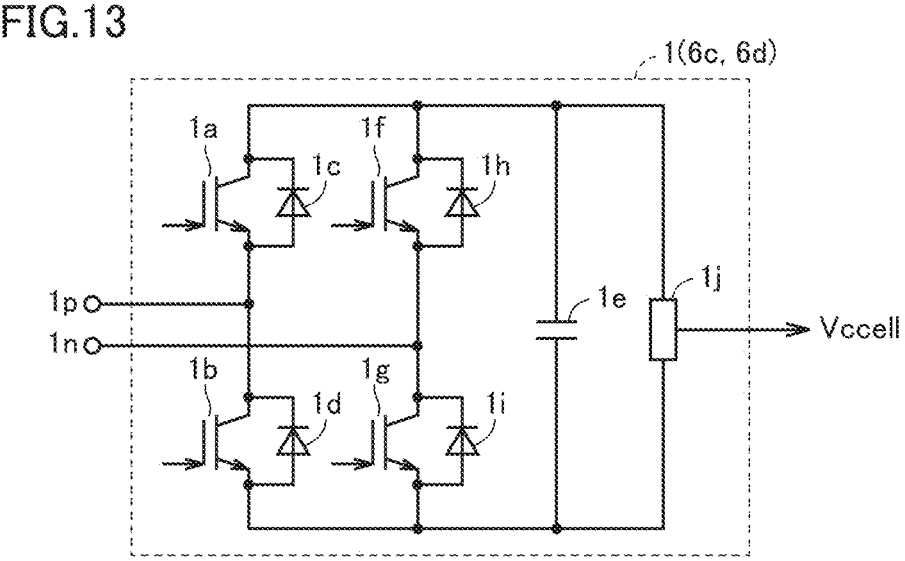
FIG. 13 is a circuit diagram showing a configuration of a converter cell 1 included in the other cell group 6c in an upper arm 13 and the other cell group 6d in a lower arm 14 in FIG. 1.

FIG. 13 is a circuit diagram showing a configuration of converter cell 1 included in the other cell group 6c in upper arm 13 and the other cell group 6d in lower arm 14 in FIG. 1. Converter cell 1 is configured to detect a voltage of DC capacitor 1e (a cell capacitor voltage Vccell) provided in the converter cell itself and to transmit a detection value to control device 5.

Specifically, converter cell 1 in FIG. 13 is based on a full-bridge configuration converter cell 1 in FIG. 2 (B) and different from converter cell 1 in FIG. 2 (B) in further including a DC voltage detector 1j in parallel to DC capacitor 1e. DC voltage detector 1j detects voltage Vccell of DC capacitor 1e and outputs detected cell capacitor voltage Vccell to control device 5. As will be described with reference to FIG. 14, in cell 1 in FIG. 13, switching elements 1a and 1b are used for circulating current control and not used for maintaining and controlling a voltage of DC capacitor 1e. In contrast, switching elements 1g and 1f are used for control of a voltage of DC capacitor 1e and not used for circulating current control.

[Configuration of Control Device and General Operation]

Figure 14:
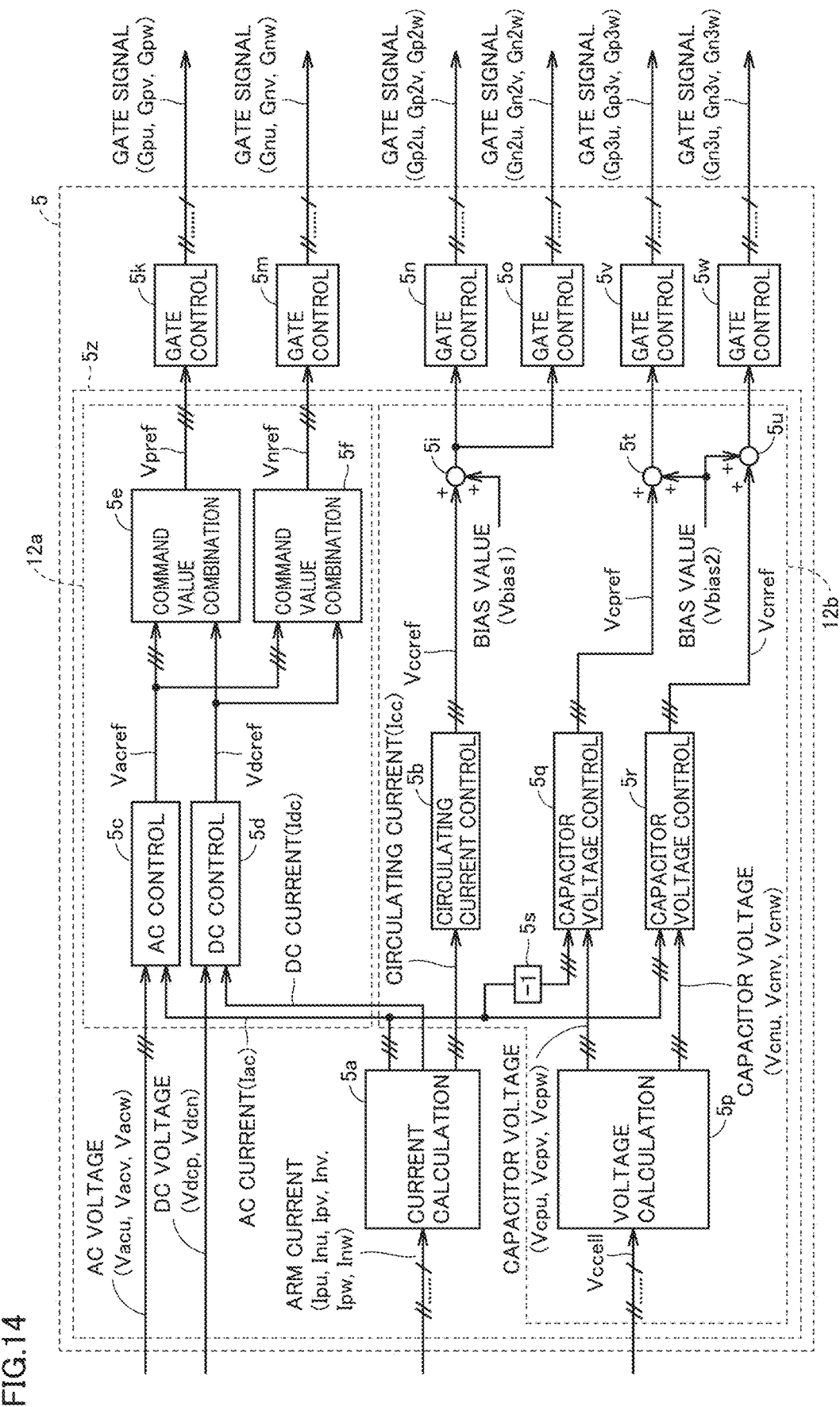
FIG. 14 is a configuration diagram of a control device 5 in FIG. 1.

FIG. 14 is a diagram of a configuration of control device 5 in FIG. 1. Control device 5 shown in FIG. 14 may be implemented by a dedicated circuit, or may be implemented in part or in its entirety by a field programmable gate array (FPGA) and/or a microprocessor. A configuration of control device 5 and a general operation by each element will be described below with reference to FIGS. 1 and 14.

Control device 5 includes voltage command value generation unit 5z and gate controllers 5k, 5m, 5n, 5o, 5v, and 5w. Gate controllers 5k and 5m correspond to positive-side cell group 6a and negative-side cell group 6b of leg circuit 8 of each phase. Gate controller 5k generates gate signals Gpu, Gpv, and Gpw for control of switching elements included in positive-side cell groups 6a in respective leg circuits 8a, 8b, and 8c. Gate controller 5m generates gate signals Gnu, Gnv, and Gnw for control of switching elements included in negative-side cell groups 6b in respective leg circuits 8a, 8b, and 8c.

Positive-side cell group 6c for circulating current control in leg circuit 8 of each phase corresponds to two gate controllers 5n and 5v and negative-side cell group 6d for circulating current control in leg circuit 8 of each phase corresponds to two gate controllers 5o and 5w. Specifically, gate controller 5n generates gate signals Gp2u, Gp2v, and Gp2w for control of switching elements 1a and 1b provided in cell 1 in positive-side cell groups 6c in respective leg circuits 8a, 8b, and 8c. Gate controller 5o generates gate signals Gn2u, Gn2v, and Gn2w for control of switching elements 1a and 1b provided in cell 1 in negative-side cell groups 6d in respective leg circuits 8a, 8b, and 8c. Gate controller 5v generates gate signals Gp3u, Gp3v, and Gp3w for control of switching elements 1g and 1f provided in cell 1 in positive-side cell groups 6c in respective leg circuits 8a, 8b, and 8c. Gate controller 5w generates gate signals Gn3u, Gn3v, and Gn3w for control of switching elements 1g and 1f provided in cell 1 in negative-side cell groups 6d in respective leg circuits 8a, 8b, and 8c.

Voltage command value generation unit 5z supplies a voltage command value to gate controllers 5k, 5m, 5n, 5o, 5v, and 5w. Specifically, voltage command value generation unit 5z includes current calculator 5a, circulating current controller 5b, AC controller 5c, DC controller 5d, command value combination units 5e and 5f, a voltage calculator 5p, capacitor voltage controllers 5q and 5r, adders 5i, 5t, and 5u, and a gain circuit 5s.

Current calculator 5a takes in positive-side arm currents Ipu, Ipv, and Ipw detected by current detector 9a provided in positive-side arm 13 of leg circuit 8 of each phase and negative-side arm currents Inu, Inv, and Inw detected by current detector 9b provided in negative-side arm 14 of leg circuit 8 of each phase. Current calculator 5a calculates AC current values Iacu, Iacv, and Iacw, DC current value Idc, and circulating current values Iccu, Iccv, and Iccw based on the arm currents that have been taken in. Current calculator 5a outputs calculated AC current values Iacu, Iacv, and Iacw to AC controller 5c, outputs calculated DC current value Idc to DC controller 5d, and outputs calculated circulating current values Iccu, Iccv, and Iccw to circulating current controller 5b. Current calculator 5a further outputs a result of multiplication by gain circuit 5s of calculated AC current values Iacu, Iacv, and Iacw by −1 to capacitor voltage controller 5q, and outputs calculated AC current values Iacu, Iacv, and Iacw to capacitor voltage controller 5r.

U-phase AC current Iacu, V-phase AC current Iacv, and W-phase AC current Iacw (denoted as AC current Iac when they are collectively referred to) that flow from AC terminals Nu, Nv, and Nw of leg circuit 8 toward transformer 3 are defined as positive. DC current Idc from DC circuit 4 toward positive-side DC terminal Np and from negative-side DC terminal Nn toward DC circuit 4 is defined as positive. Circulating currents Iccu, Iccv, and Iccw (which are denoted as circulating current Icc when they are collectively referred to) that flow through leg circuits 8a, 8b, and 8c from positive-side DC terminal Np toward negative-side DC terminal Nn are defined as positive.

U-phase, V-phase, and W-phase AC voltage values Vacu, Vacv, and Vacw (which are denoted as AC voltage value Vac when they are collectively referred to) detected by AC voltage detector 10 are input to AC controller 5c. AC controller 5c generates U-phase, V-phase, and W-phase AC voltage command values Vacrefu, Vacrefv, and Vacrefw (which are denoted as AC voltage command value Vacref when they are collectively referred to) based on input AC current value Iac and AC voltage value Vac.

DC voltage values Vdcp and Vdcn detected by DC voltage detectors 11a and 11b are further input to DC controller 5d. DC controller 5d generates DC voltage command value Vdcref based on input DC voltage values Vdcp and Vdcn and DC current value Idc.

Command value combination unit 5e generates voltage command value Vprefu for U-phase positive-side cell group 6a by combining U-phase AC voltage command value Vacrefu and DC voltage command value Vdcref. Similarly, command value combination unit 5e generates voltage command value Vprefv for V-phase positive-side cell group 6a by combining V-phase AC voltage command value Vacrefv and DC voltage command value Vdcref. Command value combination unit 5e further generates voltage command value Vprefw for W-phase positive-side cell group 6a by combining W-phase AC voltage command value Vacrefw and DC voltage command value Vdcref. Generated voltage command values Vprefu, Vprefv, and Vprefw (which are denoted as voltage command value Vpref when they are collectively referred to or when an unspecified voltage command value is referred to) are input to gate controller 5k.

Command value combination unit 5f generates voltage command value Vnrefu for U-phase negative-side cell group 6b by combining U-phase AC voltage command value Vacrefu and DC voltage command value Vdcref. Similarly, command value combination unit 5f generates voltage command value Vnrefv for V-phase negative-side cell group 6b by combining V-phase AC voltage command value Vacrefv and DC voltage command value Vdcref. Command value combination unit 5f further generates voltage command value Vnrefw for W-phase negative-side cell group 6b by combining W-phase AC voltage command value Vacrefw and DC voltage command value Vdcref. Generated voltage command values Vnrefu, Vnrefv, and Vnrefw (which are denoted as voltage command value Vnref when they are collectively referred to or when an unspecified voltage command value is referred to) are input to gate controller 5m.

Circulating current controller 5b generates voltage command values Vccrefu, Vccrefv, and Vccrefw (which are denoted as voltage command value Vccref when they are collectively referred to or when an unspecified voltage command value is referred to) for control of circulating currents of respective phases based on respective circulating current values Iccu, Iccv, and Iccw. A bias value Vbias1 is added to generated voltage command value Vccref for circulating current control of each phase by adder 5i, and thereafter the resultant voltage command value is input to gate controllers 5n and 5o.

Voltage calculator 5p receives information on cell capacitor voltage Vccell from each cell 1 provided in cell groups 6c and 6d of leg circuits 8a, 8b, and 8c of the respective phases shown in FIG. 1. Voltage calculator 5p calculates a representative value Vcp (Vcpu of the U phase, Vcpv of the V phase, and Vcpw of the W phase) of a plurality of cell capacitor voltages of positive-side cell group 6c for each of the U phase, the V phase, and the W phase based on received information on cell capacitor voltage Vccell and calculates a representative value Vcn (Vcnu of the U phase, Vcnv of the V phase, and Vcnw of the W phase) of a plurality of cell capacitor voltages of negative-side cell group 6d. An average value, a median, a maximum value, or a minimum value of cell capacitor voltages Vccell of each cell group can be applied as appropriate to calculation of the representative value. Voltage calculator 5p outputs representative values Vcpu, Vcpv, and Vcpw of the cell capacitor voltages of each positive-side cell group 6c to capacitor voltage controller 5q and representative values Vcnu, Vcnv, and Vcnw of the cell capacitor voltages of each negative-side cell group 6d to capacitor voltage controller 5r.

Capacitor voltage controller 5q receives information on cell capacitor voltage values Vcpu, Vcpv, and Vcpw of positive-side cell group 6c from voltage calculator 5p and receives information on AC current values (−Iacu, −Iacv, and −Iacw) opposite in phase (that is, multiplied by −1) from current calculator 5a. Capacitor voltage controller 5q generates voltage command value Vcpref (Vcprefu for the U phase, Vcprefv for the V phase, and Vcprefw for the W phase) for control of a capacitor voltage of each cell 1 in positive-side cell group 6c based on the received information. A bias value Vbias 2 is added to generated voltage Vcpref by adder 5t, and thereafter the resultant voltage is input to gate controller 5v.

Capacitor voltage controller 5r receives information on cell capacitor voltage values Vcnu, Vcnv, and Vcnw of negative-side cell group 6d from voltage calculator 5p and receives information on AC current values Iacu, Iacv, and Iacw from current calculator 5a. Capacitor voltage controller 5r generates voltage command value Vcnref (Vcnrefu for the U phase, Vcnrefv for the V phase, and Vcnrefw for the W phase) for control of a capacitor voltage of each cell 1 in negative-side cell group 6d based on the received information. Bias value Vbias2 is added to generated voltage Vcnref by adder 5u and the resultant voltage is input to gate controller 5w.

[Operations of Gate Controller and Effect Thereof]

(Operations of Gate Controllers 5k and 5m)

Gate controller 5k provides corresponding one of gate signals Gpu, Gpv, and Gpw to a switching element in cell 1 included in positive-side cell group 6a of a corresponding phase based on U-phase, V-phase, and W-phase voltage command values Vprefu, Vprefv, and Vprefw combined by command value combination unit 5e. Gate controller 5m provides corresponding one of gate signals Gnu, Gnv, and Gnw to a switching element in cell 1 included in negative-side cell group 6b of a corresponding phase based on U-phase, V-phase, and W-phase voltage command values Vnrefu, Vnrefv, and Vnrefw combined by command value combination unit 5f.

As described already, in half-bridge cell 1 shown in FIG. 2 (A), when a voltage of DC capacitor 1e is output, switching element 1a is turned on and switching element 1b is turned off. When a zero voltage is output, switching element 1a is turned off and switching element 1b is turned on on the contrary. A pulse width modulation (PWM) scheme is employed in the present embodiment as a scheme for controlling a converter which can output a binary voltage level.

(Operations of Gate Controllers 5n and 5o and Effect Thereof)

Gate controllers 5n and 5o output a gate signal for control of switching of switching elements 1a and 1b provided in each cell 1 in cell groups 6c and 6d in accordance with a result of addition of voltage command value Vccref and bias value Vbias1. Gate controllers 5n and 5o can be operated under the pulse width modulation scheme similarly to gate controllers 5k and 5m.

Circulating current Icc is a bipolar signal that has positive and negative values. Therefore, voltage command value Vccref output from circulating current controller 5b is also a bipolar signal. In this case, a duty factor (duty) of switching elements 1a and 1b is desirably set to 50% when voltage command value Vccref is 0. In order to realize this operation, adder 5i adds bias value Vbias1 to voltage command value Vccref.

Circulating current Icc is equal in value between positive-side cell group 6c and negative-side cell group 6d. Therefore, common voltage command value Vccref is provided to gate controllers 5n and 5o.

As described in the first embodiment, circulating current controllability can be enhanced by setting a frequency of a PWM signal generated by gate controllers 5n and 5o to be higher than a frequency of a PWM signal generated by gate controllers 5k and 5m.

(Operations of Gate Controllers 5v and 5w and Effect Thereof)

Gate controller 5v outputs a gate signal for control of switching of switching elements 1f and 1g provided in each cell 1 in cell group 6c in accordance with a result of addition of voltage command value Vcpref and bias value Vbias2. Gate controller 5v can be operated under the pulse width modulation scheme similarly to gate controllers 5k and 5m.

Similarly, gate controller 5w outputs a gate signal for control of switching of switching elements 1f and 1g provided in each cell 1 in cell group 6d in accordance with a result of addition of voltage command value Vcnref and bias value Vbias2. Gate controller 5w can be operated under the pulse width modulation scheme similarly to gate controllers 5k and 5m.

When bias value Vbias2 is set to a value as large as bias value Vbias1, in a full-bridge configuration like cell 1 shown in FIG. 13, a duty factor is identical among switching elements 1a, 1b, 1f, and 1g while the circulating current is 0. Consequently, a time average value of an output voltage across input and output terminals 1p and 1n is zero and DC capacitor 1e is not charged or discharged even though a current flows. Since a voltage output from cell 1 in accordance with voltage command value Vccref output from circulating current controller 5b is applied to reactors 7a and 7b, a reactive power component is dominant. Therefore, by adjusting charging or discharging power from an equilibrium state corresponding to bias value Vbias2 in accordance with voltage command values Vcpref and Vcnref output from capacitor voltage controllers 5q and 5r, a voltage of DC capacitor 1e can efficiently be controlled.

By setting a frequency of a PWM signal generated by gate controllers 5v and 5w to be higher than a frequency of a PWM signal generated by gate controllers 5k and 5m, capacitor voltage controllability can be enhanced. A PWM signal generated by gate controllers 5v and 5w may be equal to or different from a PWM signal generated by gate controllers 5n and 5o in frequency.

[First Modification]

As described in the second embodiment, a plurality of CPUs may be provided in control device 5 in FIG. 1, at least one first CPU may perform calculation relating to voltage command values Vpref and Vnref, and at least one second CPU may perform calculation relating to voltage command values Vccref, Vcpref, and Vcnref. The second CPU may be higher in calculation capability than the first CPU, or a PLD may be employed instead of the second CPU.

[Second Modification]

Though an example in which gate controllers 5k, 5m, 5n, 5o, 5v, and 5w are provided in control device 5 is described with reference to FIG. 14, gate controller 5k, 5m, 5n, 5o, 5v, or 5w may be provided in converter cell 1 included in corresponding one of cell groups 6a, 6b, 6c, and 6d. In this case, voltage command value generation unit 5z in FIG. 14 may transmit voltage command value Vpref or Vnref to converter cell 1 included in corresponding one of cell groups 6a and 6b and transmits voltage command values Vccref, Vcpref, and Vcnref to converter cell 1 included in corresponding one of cell groups 6c and 6d. A configuration of converter cell 1 in this case will now be described.

Figure 15:
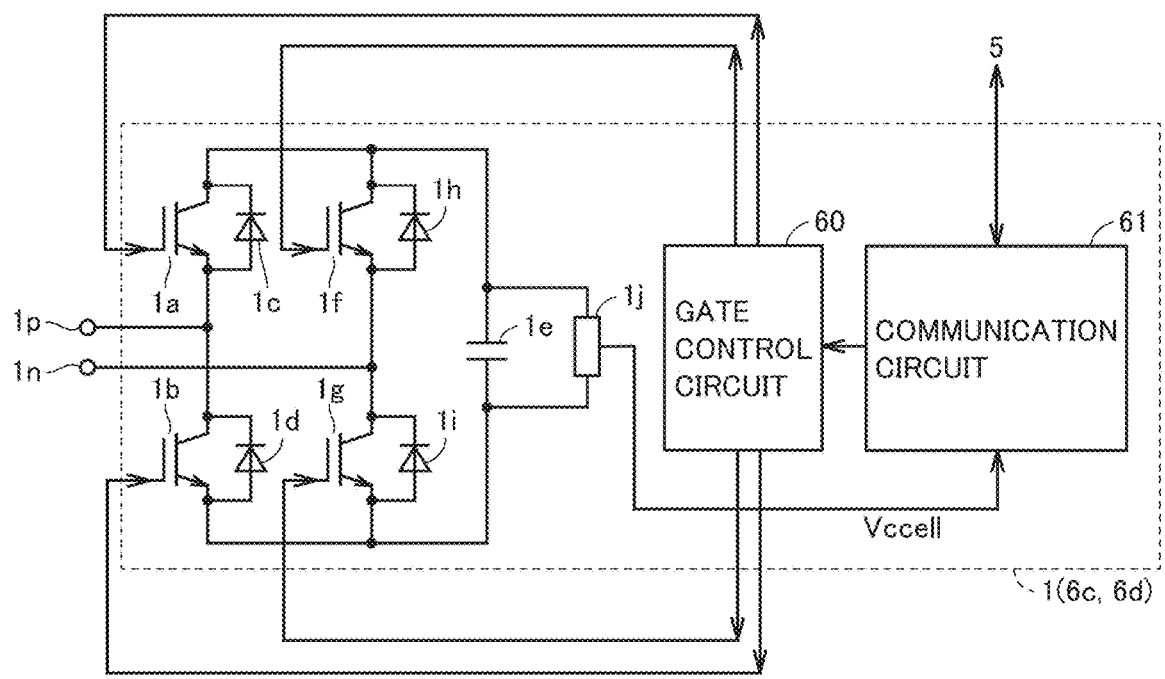
FIG. 15 is a circuit diagram showing a modification of the converter cell in FIG. 13 in a third embodiment.

FIG. 15 is a circuit diagram showing a modification of the converter cell in FIG. 13 in the third embodiment. The converter cells in FIG. 2 (A) and (C) can also similarly be modified. Converter cell 1 in FIG. 15 is different form converter cell 1 in FIG. 2 (B) in further including gate control circuit 60 and communication circuit 61.

Communication circuit 61 receives a corresponding voltage command value among voltage command values Vpref, Vnref, Vccref, Vcpref, and Vcnref by communicating with communication circuit 44 of control device 5 shown in FIG. 3. Communication circuit 61 transmits voltage Vccell of DC capacitor 1e detected by DC voltage detector 1j to communication circuit 44 of control device 5.

In an example of cell group 6a, gate control circuit 60 corresponds to gate controller 5k in FIG. 14. In an example of cell group 6b, gate control circuit 60 corresponds to gate controller 5m in FIG. 14. In an example of cell group 6c, gate control circuit 60 corresponds to gate controllers 5n and 5v in FIG. 14. In an example of cell group 6d, gate control circuit 60 corresponds to gate controllers 5o and 5w in FIG. 14. Gate control circuit 60 outputs a gate signal in accordance with a voltage command value received through communication circuit 61. Specifically, a PWM signal is generated based on comparison of a voltage command value with carrier signal CS or carrier signal CS2 as described with reference to FIG. 5.

Control device 5 and converter cell 1 according to the configuration in the modification also achieve an effect the same as in FIG. 14 described previously.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST 1 converter cell; 1a, 1b, 1f, 1g switching element; 1c, 1d, 1h, 1i diode; 1e DC capacitor; 1j, 11a, 11b DC voltage detector; 1n, 1p input and output terminal; 2 AC power system (AC circuit); 3 interconnected transformer; 4 DC power system (DC circuit); 5, 50, 51 control device; 5a current calculator; 5b circulating current controller; 5c AC controller; 5d DC controller; 5e, 5f command value combination unit; 5k, 5m, 5n, 5o, 5v, 5w gate controller; 5p voltage calculator; 5q, 5r capacitor voltage controller; 5z voltage command value generation unit; 6a, 6b, 6c, 6d cell group; 8a, 8b, 8c leg circuit; 9a, 9b arm current detector; 10 AC voltage detector; 12a, 12b control unit; 13 positive-side arm; 14 negative-side arm; 36 CPU; 60 gate control circuit; 70a, 70b comparator; 71, 71a, 71b carrier signal generator; CS, CS2 carrier signal; Gn, Gp, Gn2, Gp2 gate signal; Iac AC current; Icc circulating current; Idc DC current; In, Ip arm current value; Nn negative-side DC terminal; Np positive-side DC terminal

The invention claimed is:

1. A power conversion device that converts power between a DC circuit and an AC circuit, the power conversion device comprising:
   a plurality of leg circuits connected in parallel between a first DC terminal and a second DC terminal and electrically connected to the AC circuit, each of the plurality of leg circuits including:
      at least one first converter cell; and
      a plurality of second converter cells other than the at least one first converter cell,
   each of the at least one first converter cell and the plurality of second converter cells including a capacitor and a plurality of semiconductor switching elements,
   a first control signal that controls switching of each of the semiconductor switching elements included in the at least one first converter cell being higher in frequency than a second control signal that controls switching of each of the semiconductor switching elements included in each of the plurality of second converter cells,
   wherein the first control signal and the second control signal are pulse width modulation signals.

2. The power conversion device according to claim 1, wherein the first control signal and the second control signal are generated based on voltage command values different from each other.

3. The power conversion device according to claim 2, wherein
the first control signal is generated based on a circulating current that circulates among the plurality of leg circuits and the second control signal is generated not based on the circulating current.

4. The power conversion device according to claim 1, wherein
the at least one first converter cell is a full-bridge converter cell,
the at least one first converter cell includes:
a first semiconductor switching element and a second semiconductor switching element connected to a first end of the capacitor; and
a third semiconductor switching element and a fourth semiconductor switching element connected to a second end of the capacitor,
switching of the first semiconductor switching element and the third semiconductor switching element is controlled by the first control signal, and
switching of the second semiconductor switching element and the fourth semiconductor switching element is controlled by a third control signal identical to or different from the first control signal in frequency.

5. The power conversion device according to claim 4, wherein
the first control signal and the third control signal are generated based on voltage command values different from each other.

6. The power conversion device according to claim 5, wherein
the first control signal is generated based on a circulating current that circulates among the plurality of leg circuits and the third control signal is generated based on a capacitor voltage of the at least one first converter cell.

7. The power conversion device according to claim 1, wherein
the at least one first converter cell is identical to the plurality of second converter cells in type, the type including a half bridge type, a hybrid type, and a full bridge type.

8. The power conversion device according to claim 1, wherein
the at least one first converter cell is different from the plurality of second converter cells in type, the type including a half bridge type, a hybrid type, and a full bridge type.

9. The power conversion device according to claim 1, wherein
the first control signal has a frequency higher than four times as high as a fundamental frequency of the AC circuit.

10. The power conversion device according to claim 9, wherein
the second control signal has a frequency higher than three times and lower than four times as high as the fundamental frequency of the AC circuit.

11. The power conversion device according to claim 1, the power conversion device further comprising:
a first controller that generates the first control signal based on a first voltage command value; and
a second controller that generates the second control signal based on a second voltage command value,
the first voltage command value being shorter in calculation cycle than the second voltage command value.

12. The power conversion device according to claim 11, wherein
the first controller and the second controller are implemented by hardware components separate from each other.

13. The power conversion device according to claim 12, wherein
the first controller is higher in calculation capability than the second controller.

14. A power conversion device that converts power between a DC circuit and an AC circuit, the power conversion device comprising:
a plurality of leg circuits connected in parallel between a first DC terminal and a second DC terminal and electrically connected to the AC circuit, each of the plurality of leg circuits including:
at least one first converter cell; and
a plurality of second converter cells other than the at least one first converter cell,
each of the at least one first converter cell and the plurality of second converter cells including a capacitor and a plurality of semiconductor switching elements,
a first control signal that controls switching of each of the semiconductor switching elements included in the at least one first converter cell being higher in frequency than a second control signal that controls switching of each of the semiconductor switching elements included in each of the plurality of second converter cells,
wherein the at least one first converter cell is identical to the plurality of second converter cells in type, the type including a half bridge type, a hybrid type, and a full bridge type.

15. A power conversion device that converts power between a DC circuit and an AC circuit, the power conversion device comprising:
a plurality of leg circuits connected in parallel between a first DC terminal and a second DC terminal and electrically connected to the AC circuit, each of the plurality of leg circuits including:
at least one first converter cell; and
a plurality of second converter cells other than the at least one first converter cell,
each of the at least one first converter cell and the plurality of second converter cells including a capacitor and a plurality of semiconductor switching elements,
a first control signal that controls switching of each of the semiconductor switching elements included in the at least one first converter cell being higher in frequency than a second control signal that controls switching of each of the semiconductor switching elements included in each of the plurality of second converter cells,
wherein
the first control signal has a frequency higher than four times as high as a fundamental frequency of the AC circuit, and
the second control signal has a frequency higher than three times and lower than four times as high as the fundamental frequency of the AC circuit.

* * * * *